US00RE35037E

United States Patent [19]

Kah, Jr.

[11] E Patent Number: Re. 35,037

[45] Reissued Date of Patent: Sep. 19, 1995

[54] ROTARY SPRINKLER WITH RISER AND ADJUSTMENT MECHANISM

[76] Inventor: Carl L. C. Kah, Jr., 778 Lakeside Dr., North Palm Beach, Fla. 33408

[21] Appl. No.: 193,384

[22] Filed: Feb. 8, 1994

Related U.S. Patent Documents

Reissue of:

[64] Patent No.: 5,086,977
Issued: Feb. 11, 1992
Appl. No.: 403,758
Filed: Sep. 6, 1989

U.S. Applications:

[62] Division of Ser. No. 37,704, Apr. 13, 1987, Pat. No. 4,867,378.

[51] Int. Cl.[6] ..... B05B 15/10

[52] U.S. Cl. ..... 239/205; 239/206; 239/DIG. 1

[58] Field of Search ..... 231/200–206, 231/230, DIG. 1, 232, 240, 242, 237, 239

[56] References Cited

U.S. PATENT DOCUMENTS

| | | | |
|---|---|---|---|
| 3,035,778 | 5/1962 | Kimbro et al. | 239/DIG. 1 |
| 3,712,545 | 1/1973 | Felix | 239/DIG. 1 |
| 4,212,426 | 7/1980 | Choi | 239/230 |
| 4,220,283 | 9/1980 | Citron | 239/205 |
| 4,316,579 | 2/1982 | Ray et al. | 239/200 |
| 4,417,691 | 11/1983 | Lockwood | 239/206 |
| 4,540,125 | 9/1985 | Gorney et al. | 239/DIG. 1 |
| 4,625,914 | 12/1986 | Sexton et al. | 239/242 X |
| 4,781,327 | 11/1988 | Lawson | 239/200 |

FOREIGN PATENT DOCUMENTS

| | | |
|---|---|---|
| 2209998 | 9/1973 | Germany . |
| 1256534 | 10/1969 | United Kingdom . |

*Primary Examiner*—Andres Kashnikow
*Assistant Examiner*—Kevin P. Weldon
*Attorney, Agent, or Firm*—Fishman, Dionne & Cantor

[57] ABSTRACT

A sprinkler having a nozzle for directing a desired flow of water therefrom, the sprinkler having a water turbine drive device for rotating the nozzle in response to water passing through the sprinkler; the sprinkler has a seal between its cover and housing and with a pop-up riser, the nozzle being mounted in a rotatable nozzle housing connected to the water turbine drive device; a deflector is mounted in the nozzle housing for moving into and out of the water flow from the nozzle, the deflector being connected to a pivotally mounted arm with a cam follower actuated by a cam on the top of the riser; a modified sprinkler has two flow passages therethrough to a primary nozzle being directed through the water turbine drive device while the flow to the secondary nozzle is through a valving device to produce a predetermined contour.

66 Claims, 27 Drawing Sheets

ROTARY SPRINKLER WITH RISER AND ADJUSTMENT MECHANISM

Matter enclosed in heavy brackets [ ] appears in the original patent but forms no part of this reissue specification; matter printed in italics indicates the additions made by reissue.

*This is a reissue application Ser. No. 07/403,758 filed on Sep. 6, 1989 now U.S. Pat. No. 5,086,977, issued Feb. 11, 1992.*

This is a division of application Ser. No. 037,704, filed Apr. 13, 1987 now U.S. Pat. No. 4,867,378, issued Sept. 19, 1989.

TECHNICAL FIELD

This invention relates to sprinklers where water pressure causes the sprinkler to rotate in order to provide water precipitation over a desired area.

BACKGROUND ART

Rotatable sprinklers have been known in the prior art for use in irrigation. Patents setting forth a background for this invention are: U.S. Pat. Nos. 3,107,056; 3,713,584; 3,724,757; 3,854,664; 4,272,024; 4,353,507; and 4,568,024.

DISCLOSURE OF INVENTION

An object of this invention is to provide a sprinkler riser assembly having a long, thin-walled, seal member which is flexible, permitting better tolerance to dirt particles and providing enhanced sealing with operating pressure.

Another object of the invention is to provide a double-walled seal connected at the top, forming a cylindrical seat for the retraction spring. The long inner wall of the seal surrounding the riser assembly has sealing contact rings therearound which are pressed against the riser assembly during pressurization of the sprinkler when the riser assembly is being forced up out of the sprinkler cylindrical housing. In this construction, the sealing pressure between the seal and the riser assembly is increased by the pressure on the seal by the water pressure entering the sprinkler, just when minimum leakage is desired; and this pressure is removed when only the spring retraction force is available to retract the riser assembly into the sprinkler cylindrical housing.

A further object of this invention is to provide a nozzle sprinkler having a rotatable nozzle housing including a nozzle, with a deflector means within said housing for programmably moving in or out of the flow directed from said nozzle during operation.

Another object of the invention is to provide a riser member on which a nozzle housing including a nozzle is located, a deflector being pivotally mounted to said nozzle housing and having a cam follower for moving said deflector, said cam follower being moved into flow from the nozzle by a cam member formed on the top of said riser member.

Another object of the invention is to provide a rotating nozzle sprinkler having primary and secondary dual flow passages therethrough connected, respectively, to a primary nozzle and secondary nozzle, said secondary flow passage having a first fixed annular opening aligned with a rotating second annular opening directing water flow to the secondary nozzle; an annular secondary flow inlet insert having arcuate inlet ports is placed in said first fixed annular opening and a secondary flow control plate having arcuate valving openings is placed over said rotating second annular opening. Sealing means are provided between said secondary flow inlet insert and flow control plate. The arcuate inlet ports and arcuate valving openings can be preselected to obtain a desired flow pattern from the secondary nozzle.

A further object of the invention is to provide a pop-up rotating nozzle sprinkler with two nozzle water passageways therethrough, one passageway bypasses a turbine drive system for the rotating nozzle sprinkler to provide full water source pressure to at least one of the nozzles for maximum range, the second passageway passes through the turbine drive system to rotate the nozzle sprinkler and to provide water at a reduced pressure to the other of the nozzles for a shorter range.

Another object of the invention is to provide the outer housing of a nozzle sprinkler with a lug that allows lock wiring of the housing to a water supply pipe to prevent rotation thereof which (1) provides for easy turning of the riser member in said housing for directionally positioning the nozzle; (2) provides for easily removing or replacing the cover on the housing without the need of holding the housing; and (3) provides a deterrent to unauthorized removal, including theft.

A further object of this invention is to provide a rotatable nozzle housing having a cylindrical nozzle positioned in a cylindrical bore for rotation, said nozzle exit opening being located on a center line of said cylindrical nozzle while the outlet passageway of the nozzle has an axis which is at an angle to the axis of the cylindrical nozzle; rotation of said nozzle will angularly change the water stream leaving the nozzle to elevate or lower the stream to attain desired water pattern results. This movement maintains the same relationship of the nozzle exit opening with a fixed position of a deflector.

Another object of this invention is to provide a rotatable nozzle housing having a cylindrical nozzle positioned in a cylindrical bore, said nozzle having two flow passageways therethrough, a center conventional nozzle flow passage and a staggered nozzle flow passage where water flow is directed through large angle turns, said flow being blocked and forced to turn and impact on a surface and then turn and exit out the nozzle. This configuration provides turbulence for short range stream breakup and coverage even with larger passage sizes used to obtain insensitivity to dirt. This configuration is simple for easy manufacture, as a single molded part can be created by only straight pull cores.

A further object of this invention is to provide a sealing device for sealing a shaft extending between a first housing containing a pressurized lubricant and a second housing containing pressurized water; said first housing including a gear driving means while said second housing is fixed to said output shaft and has a nozzle therein.

Another object of the present invention is to provide a rotating nozzle sprinkler having a water driven gear box containing lubricant vented through the bottom of the gear box to water under pressure flowing past the gear box through the sprinkler; the vent has a cylindrical bore in the gear box extending downwardly while the lower gear box cover has an annular member extending upwardly and placed in said bore, the vent between the lubricant and water is an extended passage between the gear box cylindrical bore and gear box cover annular member, a passage extender, and a felt plug. The high point of the vent has an expanded volume to allow any lubricant getting into the high point area to float and coalesce on the more dense water.

Another object of the invention is to provide a cover and riser assembly removal and replacing tool for a water sprinkler, said tool having a handle to permit one to remove or replace the cover and riser assembly in a standing position. This is one advantage of having the housing of the sprinkler fixed against rotation, and having a quick connect-disconnect connection between the cover and housing.

A further object of the invention is to provide a cover and riser assembly removal and replacing tool for a water sprinkler having a cylindrical member with a recess to fit over the top of the cover and riser assembly with openings to receive equally spaced ear members on the cover, said tool having a lifting pin to engage an opening in each ear member as the tool is rotated to unlock the cover.

A further object of the invention is to provide a slip connection in the drive mechanism of the sprinkler to prevent damage by forced rotation of the sprinkler.

Another object of the invention is to provide a device which will allow the pop-up riser member to be turned within the housing of a sprinkler to properly set the nozzle with a ground reference.

A further object of the invention is to provide a cam locking cover that extends down into the cylindrical housing so that the cylindrical housing can be gripped if necessary to hold while the cover is removed or replaced. This is advantageous if the cylindrical housing is not lock wired against rotation.

Another object of the invention is to provide a sprinkler having a direct reading adjustable arc gear drive with an easily removable and replaceable cover and riser assembly having the sprinkler gear drive and a filter assembly therein, with said riser assembly being easily movable to a ground reference after replacement.

BEST MODE FOR CARRYING OUT THE INVENTION

Figure 3:
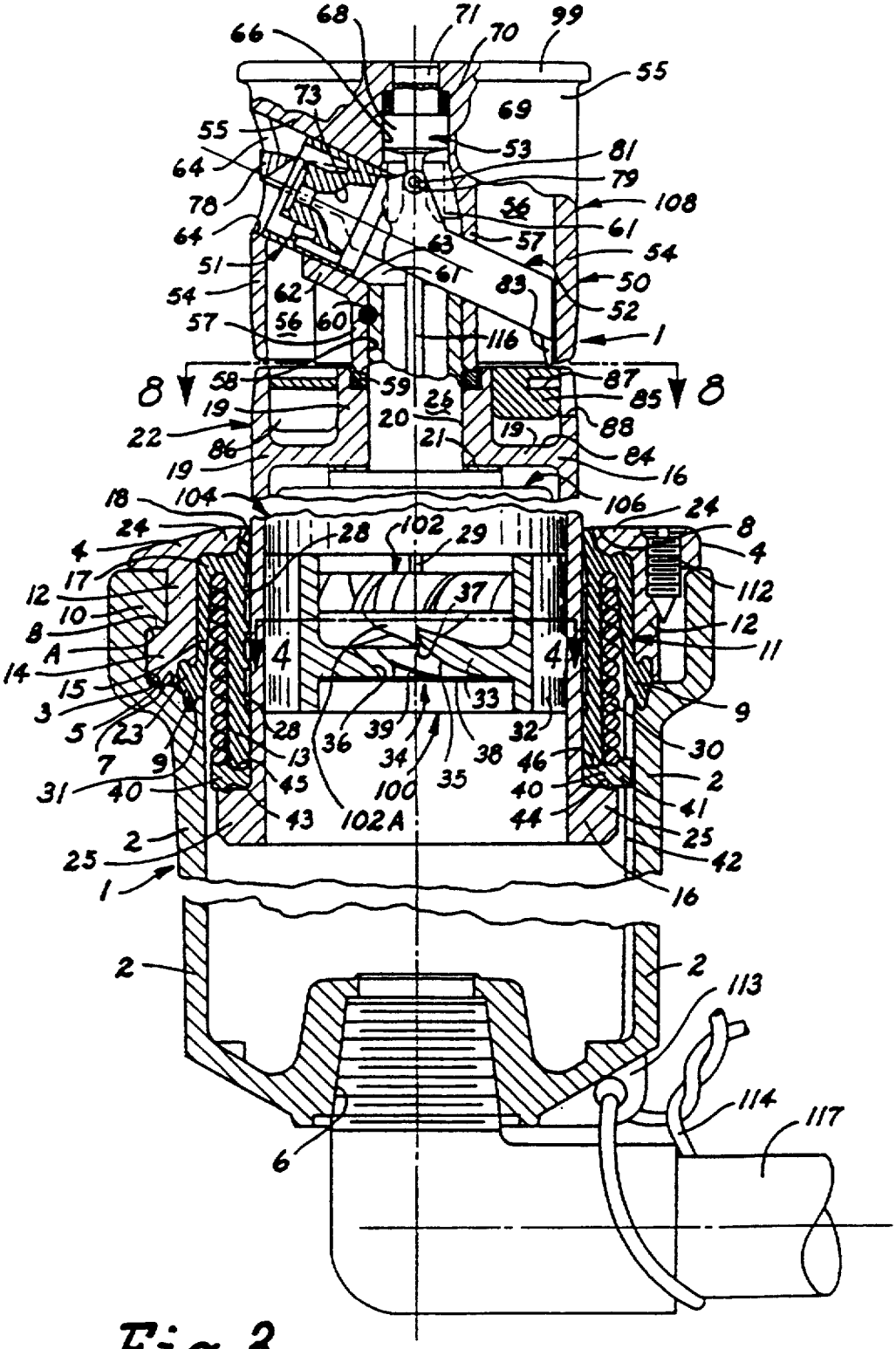
FIG. 3 is a fragmentary longitudinal sectional view of the sprinkler in its extended position taken on the line 3—3 of FIG. 2 with portions of the top of the nozzle housing shown in full; the cover and associated cylindrical housing are shown on the line 3A—3A of FIG. 2 to set forth the cooperation of the cover locking screw and top of the cylindrical housing; the turbine housing and inlet nozzle means is shown projecting out of the longitudinal section as shown by the line 2—2 of FIG. 4 and the adjustable cam member is set to cam the cam follower to vary the position of the deflector in the flow of water exiting from the nozzle.

Referring to FIG. 3 of the drawings, a pop-up sprinkler 1 is shown having a cylindrical housing 2 with a cover 4 on top thereof. An internally threaded inlet 6 is located at the center of the bottom thereof. Cover 4 is connected to the top of the cylindrical housing 2 and has an opening 8 at the center thereof for receiving an axially movable nozzle housing assembly 108 and riser member 16, and a fixed resilient cylindrical sealing member 11; said opening 8 leaving an annular flange portion 24 of cover 4 projecting inwardly over the cylindrical housing 2; said riser member 16 has an annular flange 25 at its bottom end projecting outwardly towards the wall of the cylindrical housing 2, in line with said annular portion 24. A riser member retraction spring 30 is located between said annular flange portion 24 and annular flange 25, in a manner to be hereinafter described.

In FIG. 3, the cover 4 is shown connected to the top of the cylindrical housing 2 by a quick connect-disconnect device which consists of three radial lugs 10 equally spaced around the upper part of an enlarged inner circumference 3 at the top of the cylindrical housing 2. This enlarged inner circumference 3 forms an upwardly facing annular surface 5 with the inner surface of the cylindrical housing 2. The cover 4 has a downwardly extending flange 12 with three outwardly extending lugs 14; each lug 14 is sized to pass between each pair of adjacent lugs 10. Downwardly facing surfaces A of the lugs 10 and upwardly facing surfaces B of the outwardly extending lugs 14 engage each other when the cover 4 is placed on the cylindrical housing 2 and rotated to attach the cover 4. The surfaces A and B are tapered so that during relative locking movement, the lower end surface 7 of the downwardly extending flange 12 of top cover 4 is moved towards the upwardly facing annular surface 5 of the cylindrical housing 2 to provide a sealing engagement with the flange seal portion 9 of resilient cylindrical sealing member 11 that is between the end surface 7 of the downwardly extending flange 12 of top cover 4 and the top of the upwardly facing annular surface 5 of cylindrical housing 2.

Figure 1:
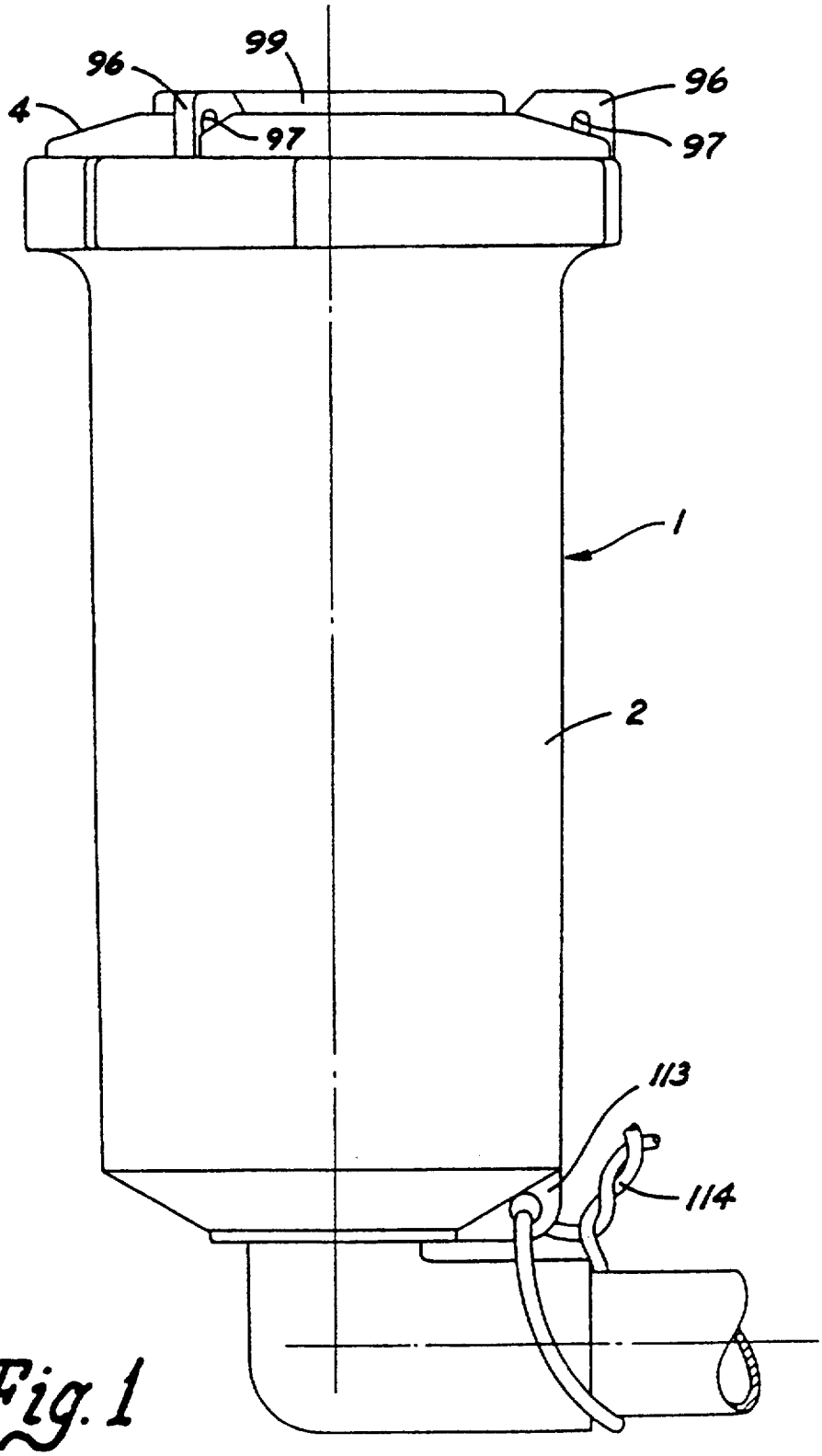
FIG. 1 is a side view of the sprinkler shown in its retracted position with the housing fixed against rotating to the water supply pipe.

The cylindrical housing 2 encloses a riser assembly 22 including the riser member 16 which provides the "pop-up" action of the sprinkler 1. The riser member 16 is slidably mounted with respect to the cylindrical housing 2 so that it moves between the down position shown in FIG. 1 and up position where the riser member 16 extends through the resilient sealing cylindrical member 11 around the opening 8 in the cover 4 as shown in FIG. 3.

To prevent unauthorized removal, including theft, of a cylindrical housing 2 from a ground location, a locking lug 113 having an opening is provided at the bottom thereof, so that the cylindrical housing 2 can be lock wired by a wire 114 to water pipe 117 leading to the opening 6. To prevent a similar removal of the sprinkler riser assembly 221, cover 4 and fixed resilient cylindrical sealing member 11, from the cylindrical housing 2, a threaded locking pin 112 is provided in the cover 4 for projecting down into the enlarged inner circumference 3 to block removal of the cover 4 by blocking the rotation of the cover 4 by contacting a lug 10.

Riser assembly 22 is comprised of five (5) main parts mounted in or on the riser member 16. These parts are:

(1) a turbine housing and inlet nozzle means 100;
(2) a water drive turbine wheel 102;
(3) a reduction gear drive 104;
(4) a reversing gear drive 106; and
(5) a sprinkler nozzle housing assembly 108 at the top.

The fixed resilient cylindrical sealing member 11 is formed of resilient sealing material, such as rubber, having a long inner cylindrical portion 13 and a shorter outer cylindrical portion 15 connected at the top by an annular portion 17; said long inner cylindrical portion 13 and outer shorter cylindrical portion 15 being spaced, and said annular portion 17 contoured to receive the upper end of retraction spring 30.

Outer shorter cylindrical portion 15 is located against the inner side of downwardly extending flange 12 of top cover 4 and has the flange seal portion 9 projecting outwardly from the bottom thereof for positioning between the end surface 7 of downwardly extending flange 12 and annular surface 5 of cylindrical housing 2. Flange seal portion 9 has an upwardly extending annular projection 23 which mates with a mating annular groove in surface 7 and a downwardly extending annular projection 31 which mates with a mating annular groove in surface 5. This downwardly extending annular projection 31 has tapered sides and is smaller at the bottom to aid in its fitting into the mating annular groove in surface 5 during assembly of the cover 4 to the housing 2.

Long inner cylindrical portion 13 is located adjacent the outer side of the movable riser assembly 22 and has sealing contact rings 28 engaging the riser assembly 22. The upper surface of annular portion 17 engages the inner surface of annular portion 24, biased by retraction spring 30. A circular lip portion 18 also extends upwardly from the annular portion 17 into opening 8 in line with the long inner cylindrical portion 13 and tapers inwardly to touch the riser assembly 22. The opening 8 is spaced outwardly a small distance from the outer surface of circular lip portion 18 to permit small movements thereof.

Figure 2:
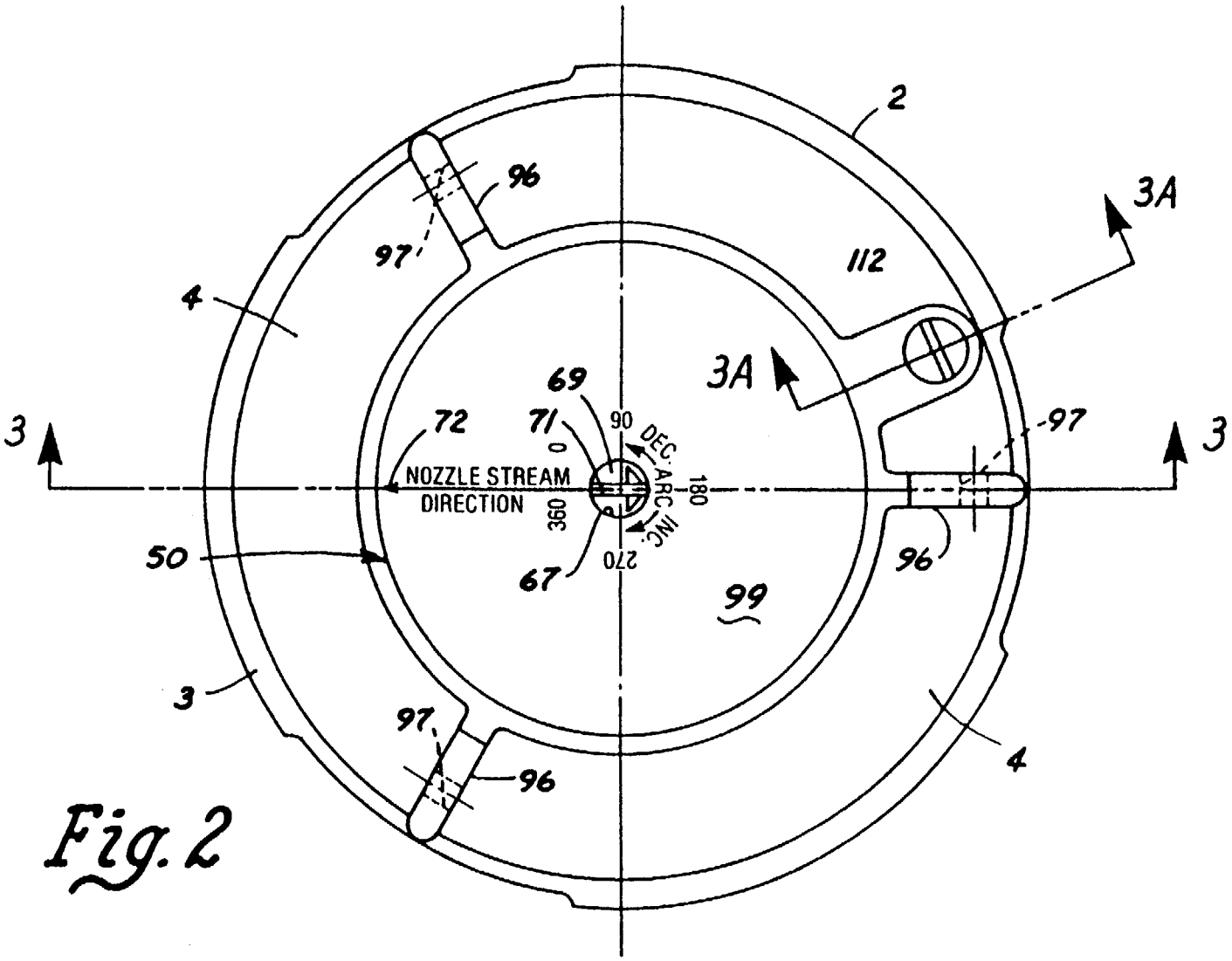
FIG. 2 is a top view of the sprinkler showing the cover and axially movable center nozzle housing assembly.

The lower end of retraction spring 30 rests in a circular spring seat in spring retainer ring 40 which is placed against annular flange 25 of riser member 16. It can be seen that retraction spring 30 biases the riser assembly 22 to its retracted position and acts on fixed resilient cylindrical sealing member 11. Spring retainer ring 40 has a radial extending projection 41 which rides in a longitudinal slot 42 along the length of cylindrical housing 2. This prevents rotation between spring retainer ring 40 and cylindrical housing 2. Small projections 43 extend downwardly from the bottom surface of the spring retainer ring 40. Each projection 43 rests in a mating recess 44 in the top surface of annular flange 25. These projections 43 and recesses 44 tend to maintain the spring retainer ring 40 and annular flange 25 at a set relative position against rotation, and therefore riser assembly 22 and cylindrical housing 2. This construction permits one to rotate the riser assembly 22 relative to the cylindrical housing 2 by forcing the projections 43, in one direction or the other, over the recesses 44 to properly place the riser assembly for its angular coverage. When the riser assembly 22 is forced by water pressure to its full "up" position, as shown in FIG. 2, the length of the compressed retraction spring 30 and the length of the long inner cylindrical portion 13 of sealing member 11 are designed to have the bottom circular sealing edge 45 of the long inner cylindrical portion 13 mate and seal with a groove 46 located around the inner edge of the spring retainer ring 40, next to the spring seat for retraction spring 30.

Riser member 16 comprises a cylindrical member open at its lower end inwardly of annular flange 25 and formed with an inwardly extending annular flange 19 at its upper end having a center shaft opening 20. The reversing gear drive 106 is located in the upper cylindrical area of riser assembly 16 with a thrust washer 21 placed against the inner surface of the annular flange 19 and with its hollow cylindrical output shaft member 26 extending through the center shaft opening 20 to the exterior of the riser member 16 and into the sprinkler nozzle housing assembly 108.

The reduction gear drive 104 is located in the cylindrical member of riser assembly 16 with an output shaft 27 (see FIG. 16) connected to the reversing gear drive 106; the reduction gear drive 104 is positioned in the cylindrical member by a press fit, also positioning the reversing gear drive 106. Details of a reversing gear drive and its operation are shown in U.S. application Ser. No. 932,470, filed Nov. 18, 1986 of Carl L. C. Kah, Jr. While a specific construction is referred to, other known reversing and reduction gear drive devices can be used. The subject matter of U.S. application Ser. No. 932,470 is included herein by reference as if it were fully set forth. Some of the figures of U.S. application Ser. No. 932,470 appear as FIG. 27 through FIG. 36, and a description of these figures appears at the end of the specification.

Turbine wheel 102 is located below said reduction gear drive 104 and is connected thereto by drive shaft 29. The turbine housing and inlet nozzle means 100 has a cylindrical housing 32 with an intermediate partition 33 which divides the cylindrical housing into two compartments, one enclosing the turbine wheel 102, while the other provides an inlet to nozzles 34 in the partition 33. The turbine housing and inlet nozzle opening means 100 has a press fit within the lower cylindrical area of riser member 16 and is located against the bottom of the reduction gear drive 104.

Figure 4:
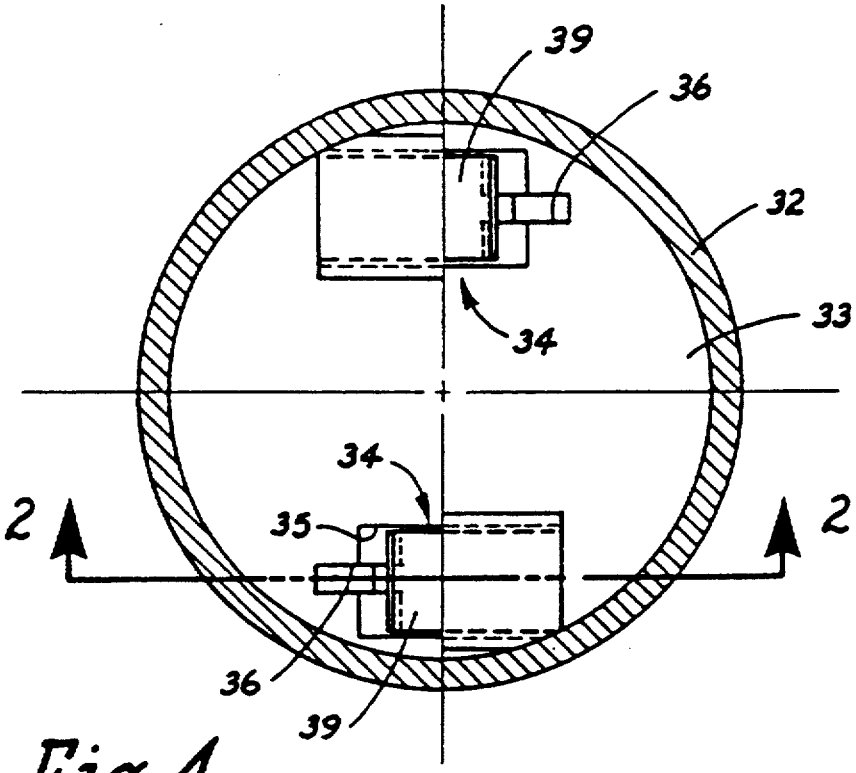
FIG. 4 is a sectional view of the turbine housing and inlet nozzle means taken on the line 4—4 of FIG. 3 showing the two nozzles and with the turbine wheel nose cone removed.

The partition 33 has two inlet nozzles 34 to direct water to the turbine wheel 102. Each nozzle is formed by an angled rectangular passageway 35 extending through the partition 33. In this construction, two nozzles 34 are shown (see FIG. 4) with the flow directed into the concave section of the blades of the turbine wheel 102. A nose cone 102A extends from the center of the turbine wheel 102 to said partition 33 between the two nozzles 34.

The forward part of the passageway 35 is formed as a flat ramp with a groove 36 extending from one end to the other through the partition 33 to provide a minimum flow area. The rearward part of the passageway has an extended rear surface 37 which extends into the compartment containing the turbine wheel 102. Said rear surface 37 is curved and has two sides to prevent the passageway 35 from directing a partial flow side ways.

Figure 5:
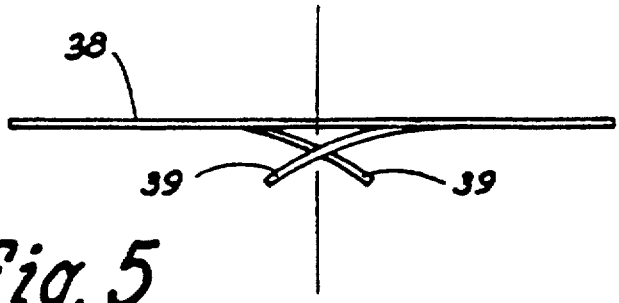
FIG. 5 is a side view of the nozzle plate with the spring fingers in their formed position.

A nozzle plate 38 is formed having two spring fingers 39 for controlling flow through the nozzles 34. The nozzle plate 38 is sized to fit in the inlet compartment of the cylindrical housing 32 against partition 33 and be fixed therein. Each spring finger 39 is pre-formed, by bending in the direction away from the direction of operative movement, as shown in FIG. 5, to provide a pre-load when the nozzle plate 38 is put in place with each spring finger 39 being placed in its passageway 35. Each spring finger 39 is pre-loaded when the spring fingers 39 are bent upwardly to be inserted in the nozzles 34 where they will rest on the flat ramp and extend over the grooves 36.

Bending the spring fingers 39 into operative position provides a pre-load on these spring fingers 39 so that they will not move further open until the pressure necessary to operate the turbine has been reached. Yet once the minimum turbine operating pressure has been reached (spring finger pre-load), they will open further with a minimum additional pressure drop. This provides for a more constant pressure differential across the turbine inlet, resulting in a more constant speed while allowing for use of different sizes of sprinkler nozzles 51.

The sprinkler nozzle housing assembly 108 is comprised of four (4) main parts. These parts are:

(1) a nozzle housing 50;

(2) a nozzle 51;

(3) a nozzle stream deflector device 52; and (4) an adjustable oscillating output control 53 for the reversing gear drive 106.

Nozzle housing 50 is formed as a cylindrical member 54 having an outer surface approximately the same diameter as that of riser member 16. The interior of the housing 50 is formed having a solid top and upper area 55 with a lower annular open area 56 formed around a downwardly extending center projection 57. The lower part of the projection 57 is formed cylindrical in shape and extends just below the bottom edge of the cylindrical member 54, and has a cylindrical opening 58 to receive the hollow cylindrical output shaft member 26 of the reversing gear drive 106. The annular bottom of the projection 57 has a sealing bead therearound to seal with an annular resilient sealing member 59 located in an annular groove in the surface of the inwardly extending annular flange 19, next to the shaft opening 20 when the sprinkler nozzle housing assembly 108 is fixed to the output shaft member 26. The nozzle housing assembly 108 is fixed to the output shaft member 26 by a pin 60. Other desired fixing means can be used.

Figure 16:
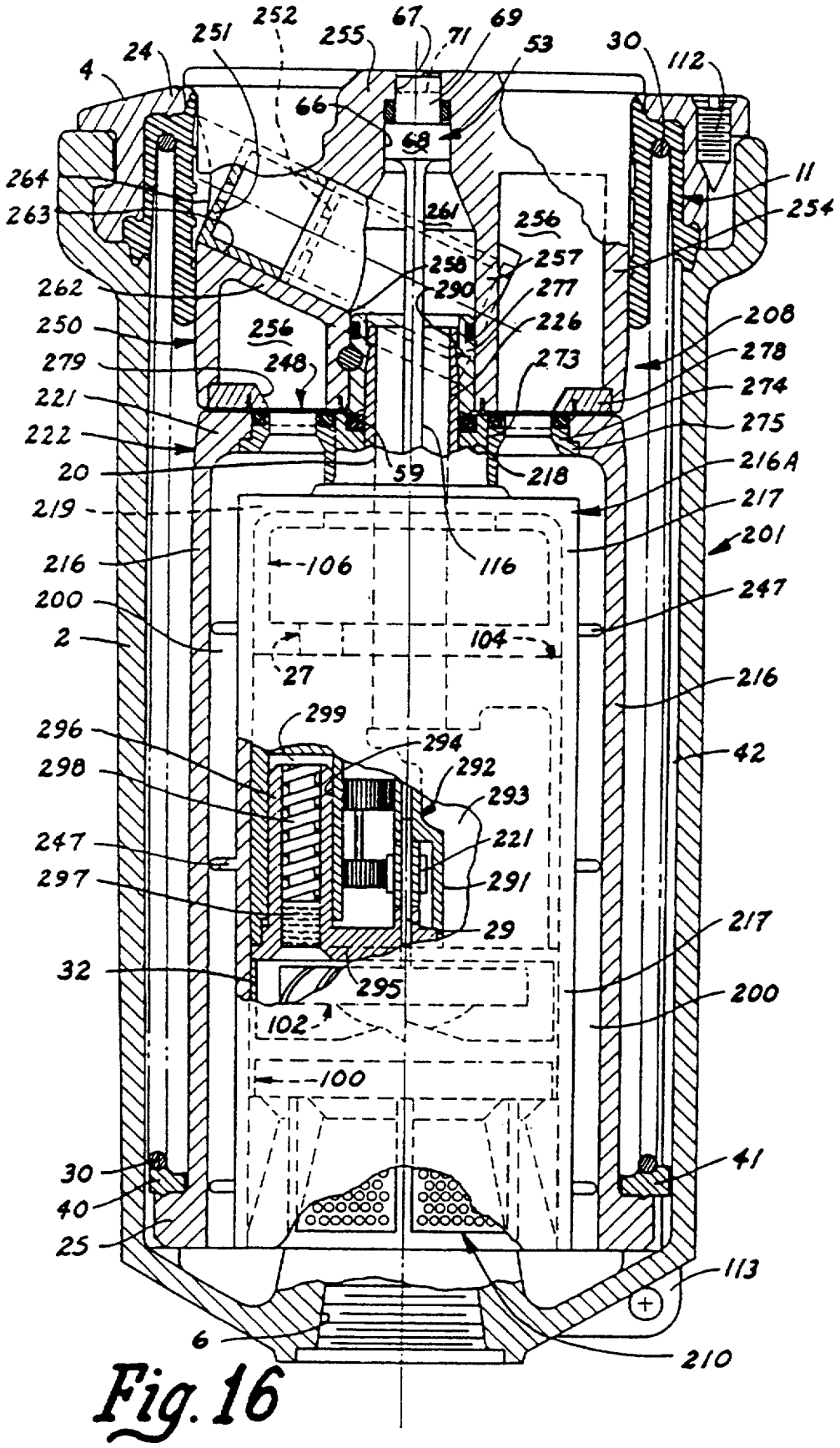
FIG. 16 is a longitudinal sectional view of a modified sprinkler having dual flow in its retracted position taken on the line 16—16 of FIG. 17 with portions of the top of the nozzle housing shown in full; the cover and associated cylindrical housing are shown on the line 16A—16A of FIG. 17 to set forth the cooperation of the cover locking screw and top of the cylindrical housing; details of secondary flow valving are shown; and primary flow and drive mechanism is shown in phantom except for gear box venting.

The reduction gear drive 104 has a gear box 292 on the left side as viewed in FIG. 16, and an open area 293 to direct water flow from the water drive turbine wheel 102 to the reversing gear drive 106 where it is connected to the hollow cylindrical output shaft member 226 for delivery to the primary nozzle 251. During assembly, the reversing gear drive 106 and gear box 292 are vacuum-filled with lubricant. The gear box 292 has a cylindrical bore 294 extending downwardly and the lower gear box cover 295 has an upwardly extending annular section 296 of a slightly lesser diameter which allows it to be slid into cylindrical bore 294 to aid in assembly and also generate a close clearance of capillary size. Irregular, spiraled, or otherwise extended, passages may be put onto the outside surface of upwardly extending annular section 296 of the gear box cover 295 to increase the effective length of the vent flow with the cylindrical bore 294. The center area of the upwardly extending annular section 296 may have a felt fiber plug 297 and a passage extender 298 cemented, or sonic-welded, into it.

Another feature of the cylindrical bore 294 extending down is that it forces recovery of any water entering to be picked up from the bottom of the gear box 292 inside where water that may have entered to pressure balance the gear box should be.

The expansion and contraction of the lubricant will be accommodated in the extended passages (felt filter plug 297, passage extender 298 and the outside of annular section 296) with any water that reaches the inside of the gear box 292 being the first material to be expelled during expansion.

Having a high-point area 299 of the extended passages with an expanded volume allows any lubricant that might make its way into the high-point area 299 to float and coalesce on top of the more dense water therein. If sufficient volume of lubricant accumulates there, it will be the material that moves in and out of the downward leg of the passage. The gears 221 and 291 are raised above the bottom of the gear box 292 to provide a volume for the vent water to accumulate in and be drawn out of.

Sealing member 59 sees water pressure on its top surface that leaks down around the interface between the output shaft member 26 and the cylindrical opening 58. This water pressure opposes the pressure coming up the shaft of the gear box lubricant around the turning cylindrical output shaft member 226. The gear box lubricant is pressurized to water pressure through passages in felt filter plug 297, passage extender 298 and the outside of annular section 296 (see FIG. 16). This provides the advantage of preventing leakage of lubricant around the output shaft. If any small leakage develops, it will be water seeping out which will tend to keep the rotating seal purged.

The upper part of the downwardly extending center projection 57 has an open area 61 connected to the top of the cylindrical opening 58. An angular projection 62 extends upwardly at a desired angle from center projection 57 and joins solid upper area 55; a cylindrical bore 63 is formed in said angular projection 62 and an aligned opening 64 is formed in the outer surface of cylindrical member 54. A nozzle 51 is inserted through the opening 64 into cylindrical bore 63 where it is fixed in place by gluing. Other fixing means can be used. It can be seen that any water entering open area 61 through hollow cylindrical output shaft member 26 will flow through nozzle 51.

Open area 61 has a cylindrical bore 66 extending upwardly in axial alignment with lower cylindrical opening 58 for a short distance, with a smaller axially aligned cylindrical bore 67 extending through the top of the nozzle housing 50. Cylindrical bore 66 and smaller cylindrical bore 67 house a cylindrical member 68 and cylindrical member 69, respectively, along with an annular O-ring seal 70. The top of the cylindrical member 69 has an adjusting slot 71 for setting the desired oscillating angle for the sprinkler. An arrowhead 72 indicates the direction that the nozzle 51 is pointing. A rod 116 extends from the cylindrical member 68 to the reversing gear drive 106 to change the angular movement of the nozzle 51.

Figure 6:
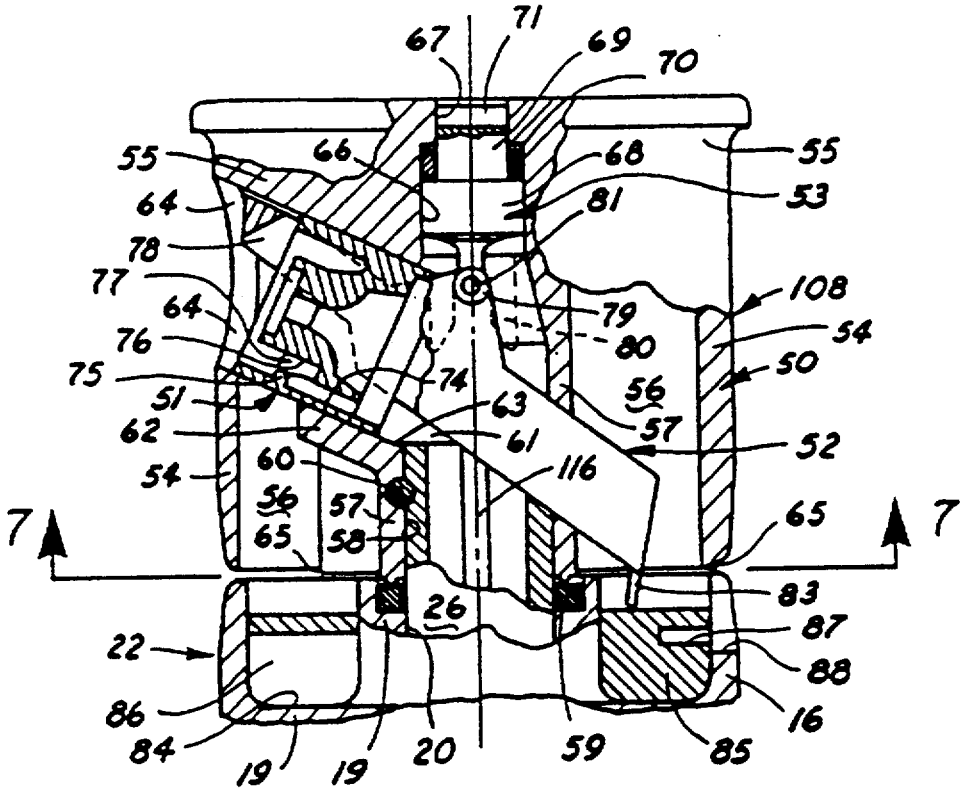
FIG. 6 is a fragmentary, longitudinal sectional view of the sprinkler nozzle housing assembly and top of the riser member of FIG. 2 showing the adjustable cam member in its down position with the deflector out of the flow of water exiting from the nozzle.
Figure 7:
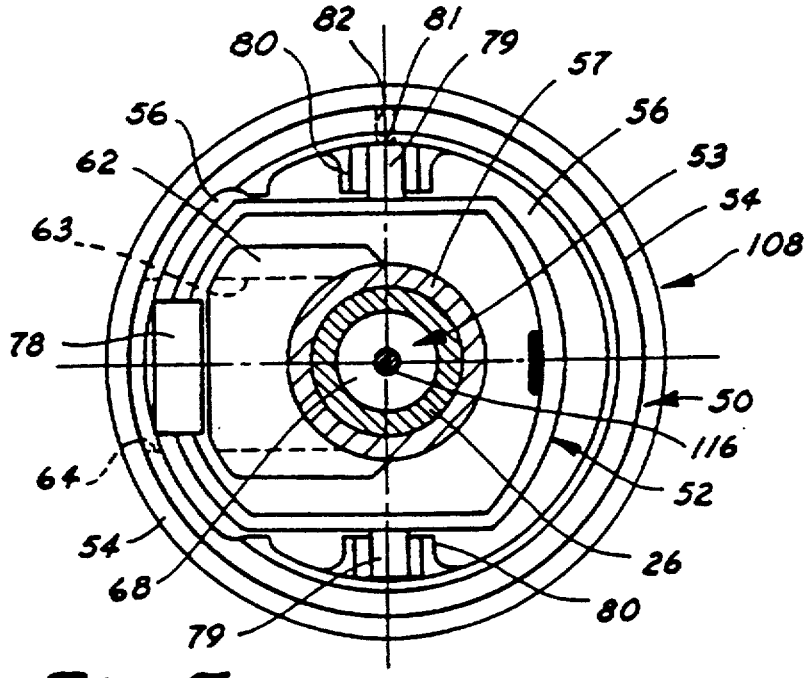
FIG. 7 is a view taken on the line 7—7 of FIG. 6 with the nozzle removed to give an unobstructed view of the nozzle stream deflector device.
Figure 8:
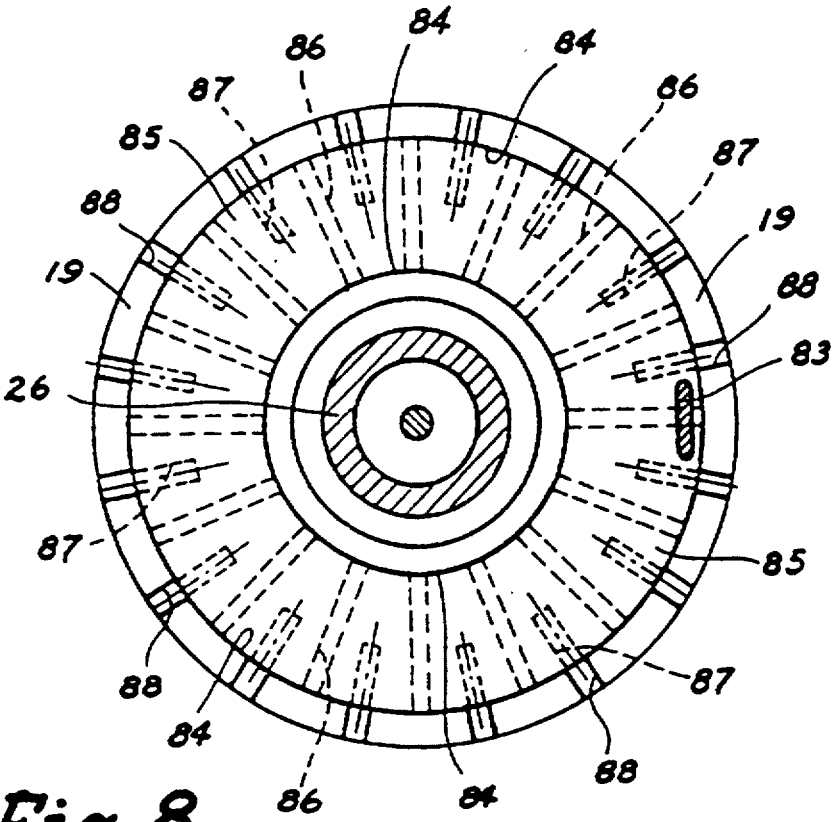
FIG. 8 is a view taken on the line 8—8 of FIG. 2 showing the adjustable cam member of the sprinkler in the annular groove in the top of the riser member.

Nozzle 51 is formed with two flow passages, a center conventional nozzle flow passage 73 and a staggered nozzle flow passage where a passage 74 (see FIG. 6) brings the flow forward to a lip 75 which blocks the flow and forces it to turn and impact on surface 76 before the flow can exit out the staggered passage 77. This configuration imparts high stream turbulence to the water passing through for good short range stream breakup and coverage. This is true even with larger passages for lower sensitivity to dirt than for the normal small short range nozzle orifices or slots.

For sprinkler coverage (range) control, a nozzle stream deflector device 52 is located in the lower annular open area 56 of the nozzle housing 50 to move a deflector 78 into or out of the flow of water exiting from nozzle 51 at desired locations during its arcuate movement to obtain a desired programmed pattern around the sprinkler. The nozzle stream deflector device 52 is formed having a forward section including the deflector 78 with a short curved section on each side to fit in the annular open area 56 between the angular projection 62 and the outer wall of the annular open area 56, and a curved rearward section which fits in the annular open area 56. Straight side connect the cooperating ends of the forward section and rearward section. Pivot shafts 79 extend one from each straight side to provide for pivotal movement of the nozzle stream deflector device 52. The outer wall of the annular open area 56 cooperating with each straight side and pivot shaft 79 has a pivot guide 80 for guiding each pivot shaft 79 to an upper stop limit where a projection 81 in one end of one pivot shaft snaps into a hole 82. This supports the nozzle stream deflector device 52 for assembly. The flow of water through the nozzle 51 acts on the deflector 78 to hold the pivot shafts 79 at their upper limit.

Figure 9:
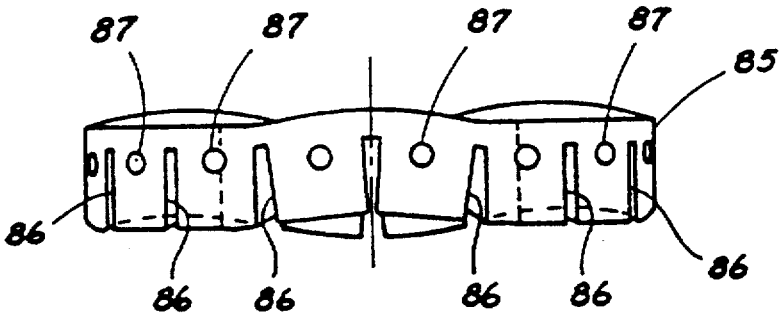
FIG. 9 is a view of an adjustable cam member of the sprinkler removed from the annular groove of the riser and preset in a curved position to achieve a desired coverage pattern around the sprinkler.

The curved rearward section of the nozzle stream deflector device 52 has a cam follower 83 for actuating the deflector to position it, said cam follower 83 extending below the outer edge of the nozzle housing 50. The top of the inwardly extending annular flange 19 has an annular groove 84 therearound with an adjustable cam member 85 therein (see FIG. 9). Adjustable cam member 85 is formed from a ring of resilient material wedged in the annular groove 84. The adjustable cam member 85 has a plurality of slices 86 around the bottom of the adjustable cam member 85 extending to around 75% of the height of the adjustable cam member 85, to permit easy variable height movement of the adjustable cam member 85 in said annular groove 84. To actuate the adjustable cam member 85, holes 87 are positioned around the top of its outer surface, said holes 87 being accessible through slots 88 spaced around the top of the riser member 16. A small diameter pin can be used to raise or lower the adjustable cam member 85 at the side away from the nozzle to achieve whatever peripheral placement is desired to achieve the desired movement of deflector 78 and sprinkler coverage range at each of the slots 88.

The inner edge of the lower end of the cylindrical member 54 of nozzle housing 50 has a downwardly extending bead 65 over the outer edge of the adjustable cam member 85 to limit the upward movement of the cam member 85. The downwardly extending bead 65 is removed below the nozzle to allow room to permit the deflector device 52 to be put in place.

The nozzle 51 can be pushed further back into passage 63 during assembly to allow putting the deflector 78 into place. It is then moved to the operating position shown in the Figures.

Figure 10:
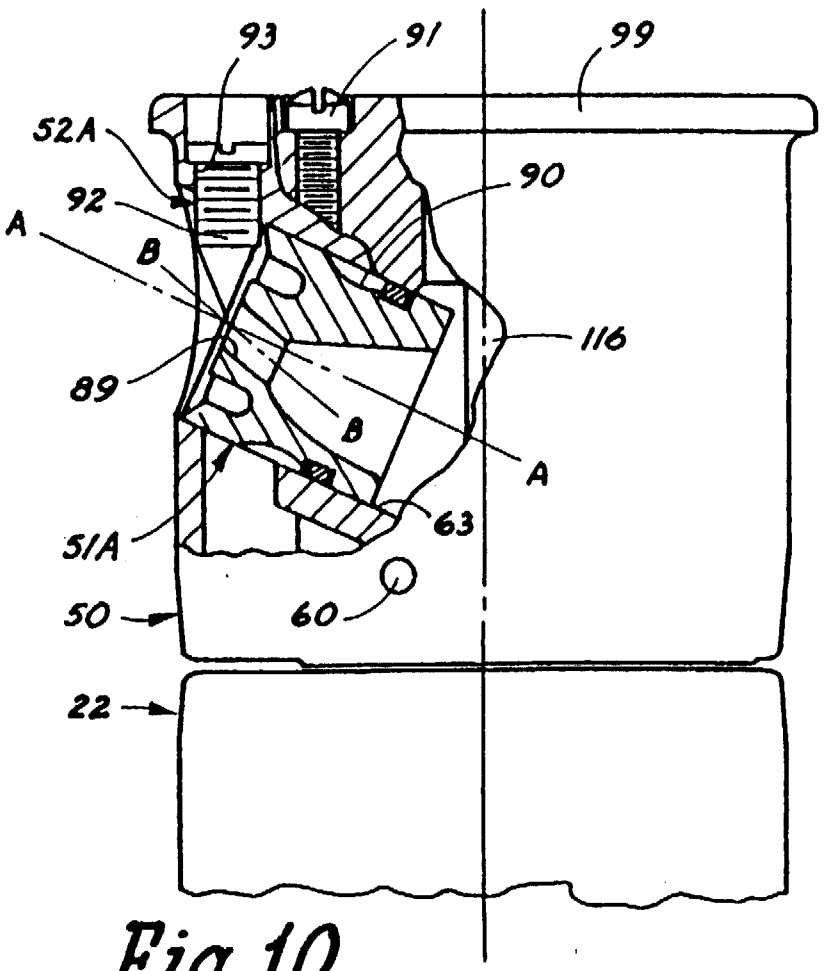
FIG. 10 is a fragmentary longitudinal view of the sprinkler nozzle housing assembly and top of the riser member partly in section showing a modified nozzle and modified manually actuated nozzle stream deflector.
Figure 11:
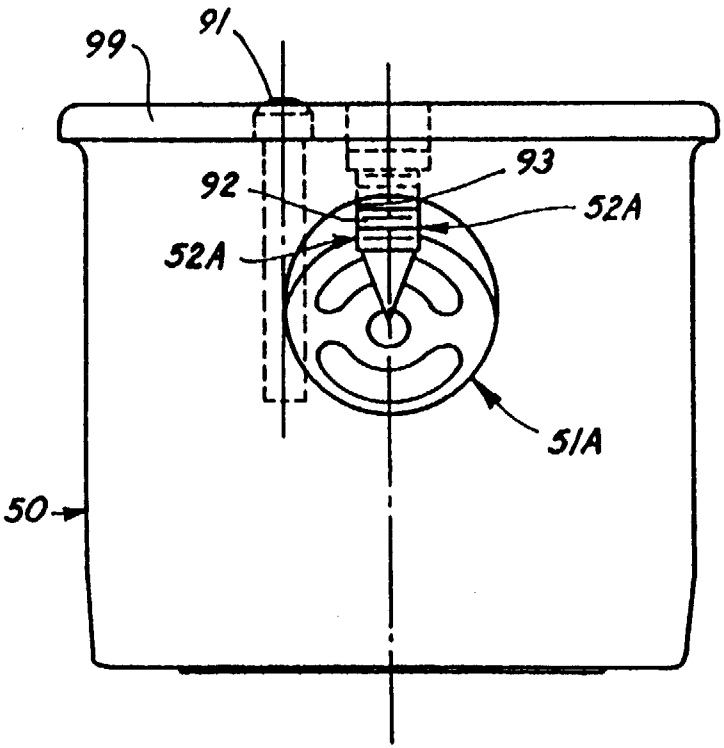
FIG. 11 is a longitudinal view of the sprinkler nozzle housing assembly taken from the left of FIG. 10.
Figure 12:
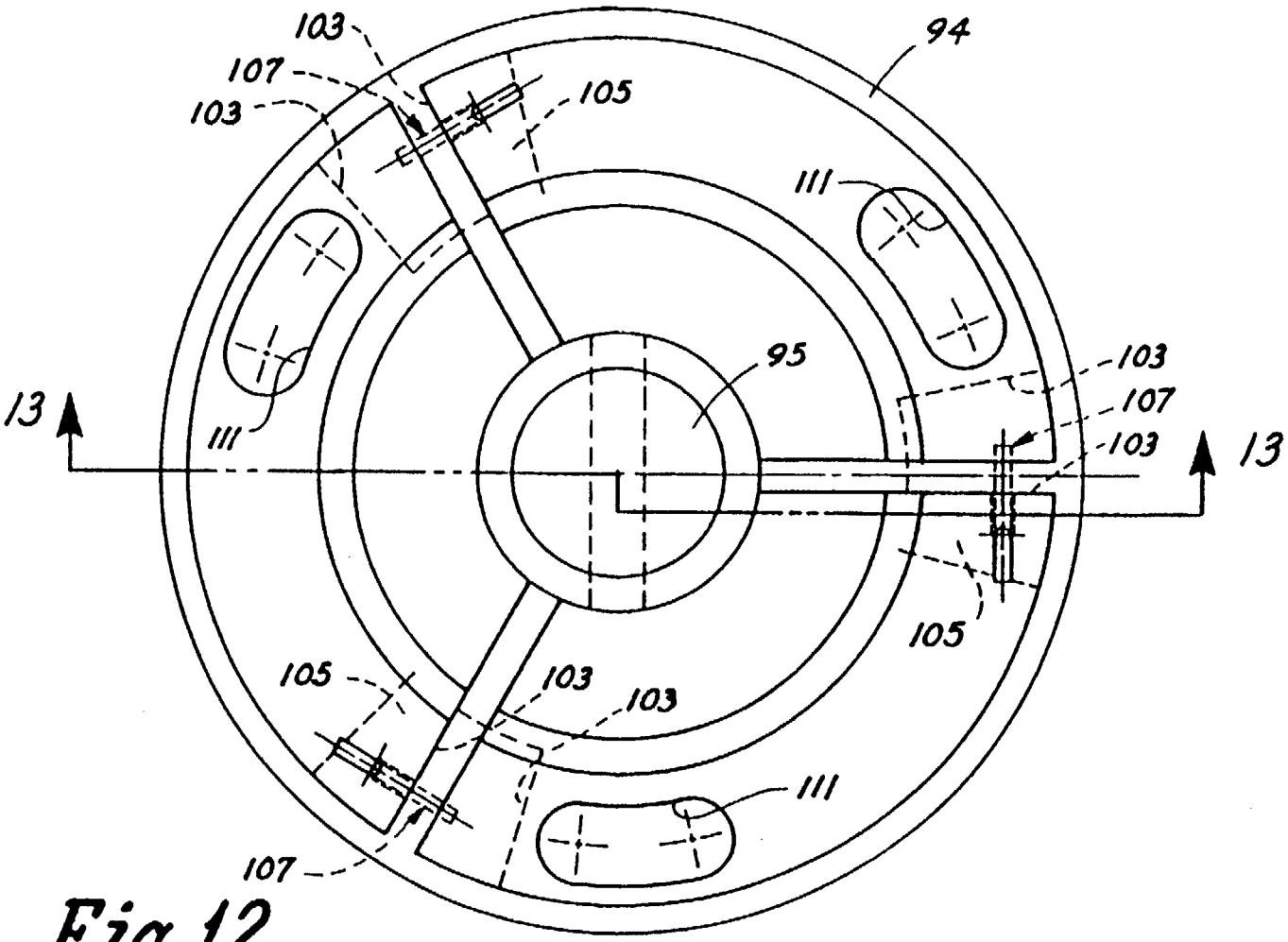
FIG. 12 is a top view of the sprinkler cover and riser assembly removal tool.

A modified sprinkler nozzle housing assembly, shown in FIGS. 10 and 11, sets forth a modified nozzle 51A and a modified manually actuated nozzle stream deflector device 52A. The nozzle 51A is sized to fit the cylindrical bore 63 and has an off-axis outlet orifice 89. Note axis A—A of cylindrical bore 63 and axis B—B of the outlet orifice 89. It can be seen that the stream exiting from the outlet orifice 89 can be angularly changed with respect to the axis A—A of the cylindrical bore 63 to elevate or lower the stream to obtain desired water pattern results. For example, if winds are to be encountered, then a lower angle of flow can be used to decrease the effect of the wind on the desired pattern.

The nozzle 51A has a groove 90 therearound which is positioned to cooperate with a screw 91. The threads of the screw 91 engage the bottom of the groove 90 to cause the nozzle 51A to rotate in cylindrical bore 63, when the screw 91 is rotated, and vary the effective angle of the off-axis outlet orifice 89. The off-axis outlet orifice 89 maintains the center location of the nozzle exit for proper relation to the breakup screw 52A or deflector device 52 as the nozzle 51A rotates.

The modified manually actuated nozzle stream deflector device 52A comprises a threaded member 92 positioned in an internally threaded hole 93 in the edge of the top of the nozzle housing 50 in line with, and intersecting, the forward part of the cylindrical bore 63 in front of the nozzle 51A. The free end of the threaded member 92 of the modified manually actuated nozzle stream deflector device 52A is contoured to vary its effect on the flow exiting the outlet orifice 89 as it is moved up and down in the flow. The contour shown is of a conical form which has a symmetrical effect on the flow therearound. Other contours can be used to obtain different sprinkler spray patterns and coverage range.

Figure 13:
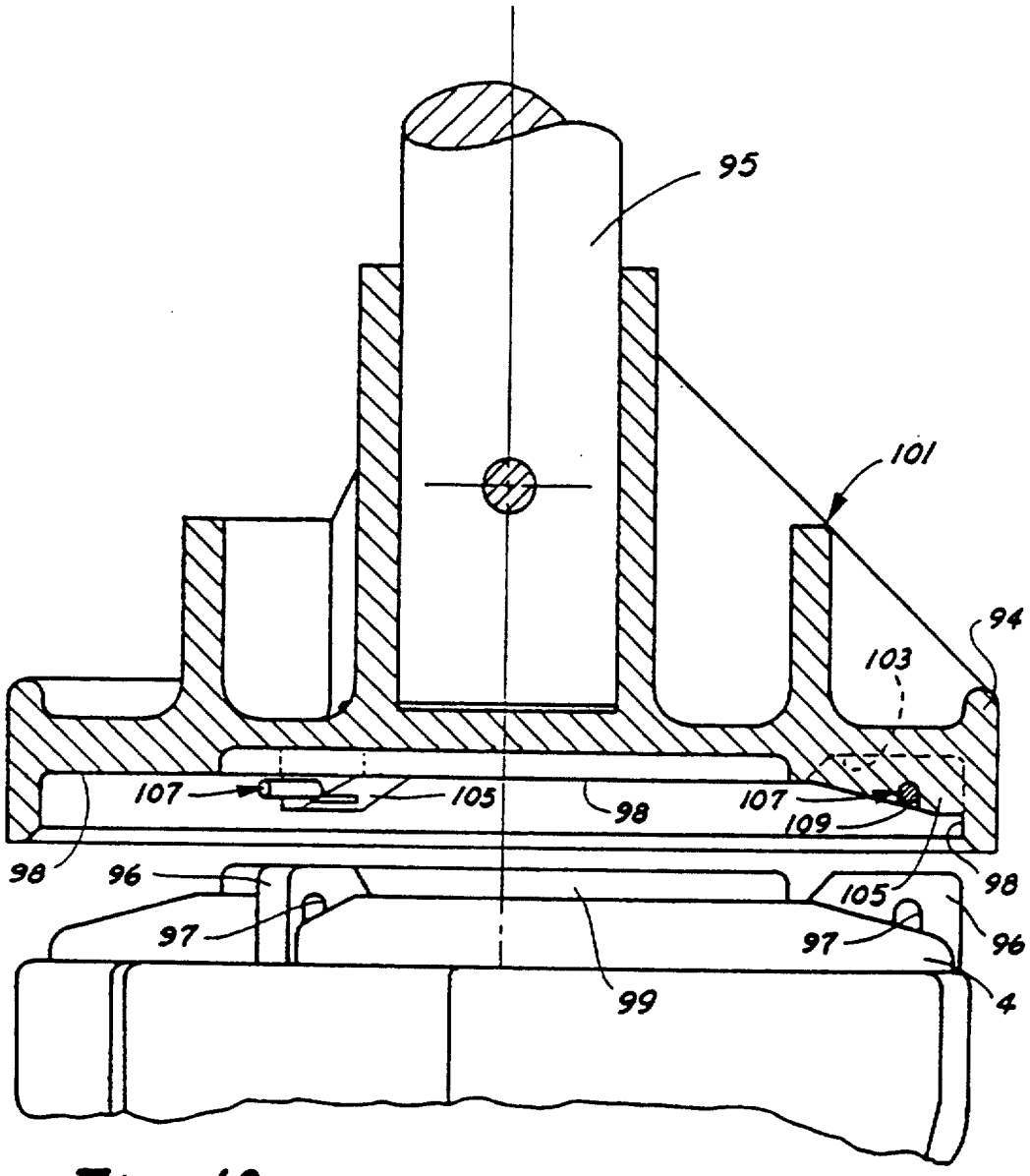
FIG. 13 is a longitudinal cross-sectional view taken on the line 13—13 of FIG. 12 showing the sprinkler cover and riser assembly removal tool and associated sprinkler.
Figure 15:
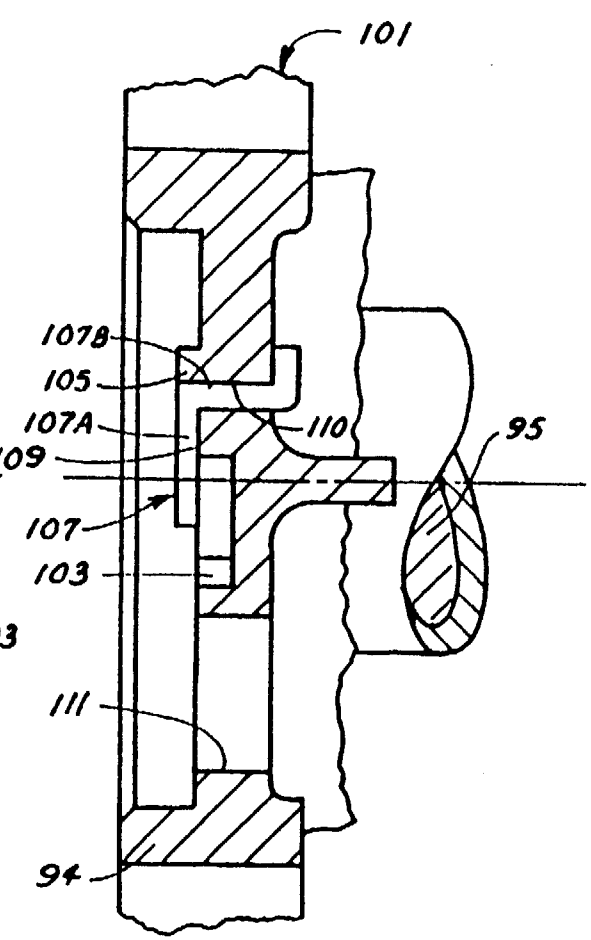
FIG. 15 is a sectional view of the sprinkler cover and riser assembly removal tool taken on the line 15—15 of FIG. 14.
Figure 14:
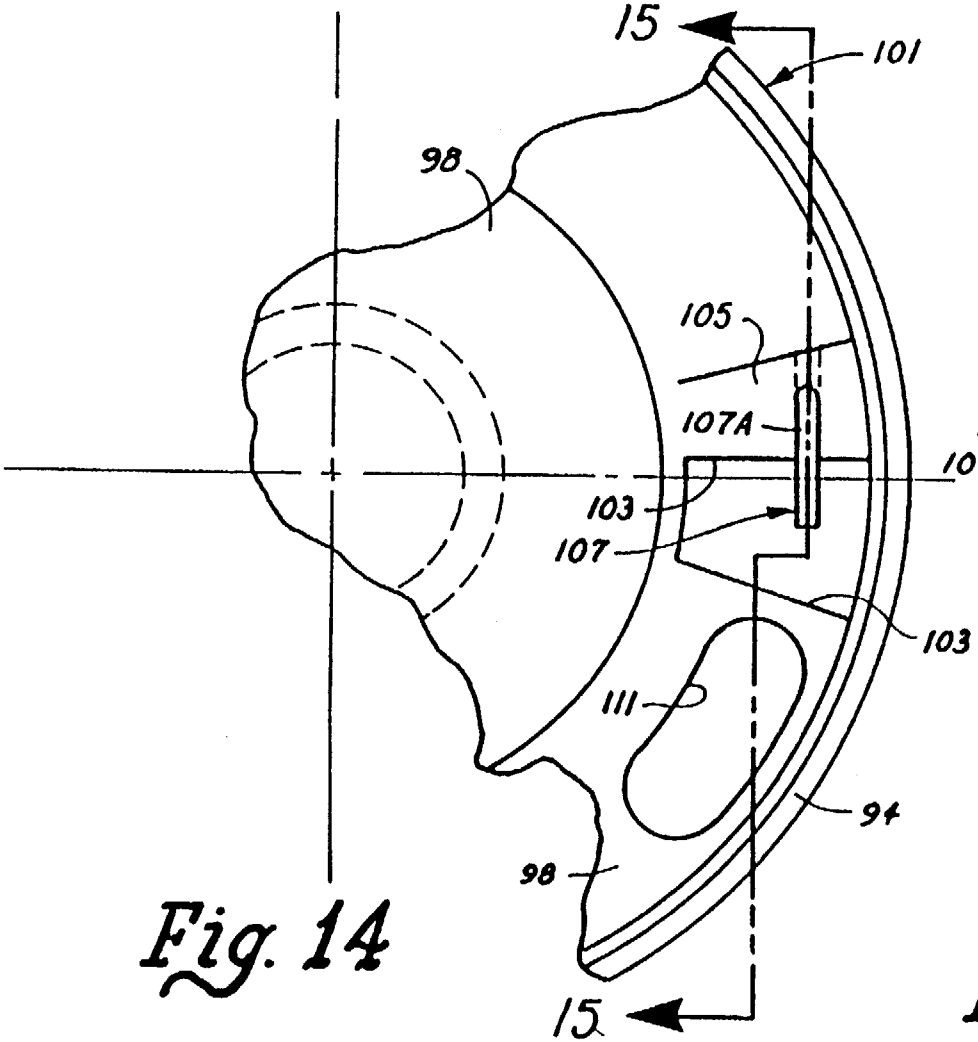
FIG. 14 is a fragmentary bottom view of a portion of the sprinkler cover and riser assembly removal tool showing a cover engaging and lifting rod.

A sprinkler cover and riser assembly removal tool 101 (see FIG. 13) is provided for easy access to the interior of the sprinkler 1. The removal tool 101 comprises a cylindrical cap member 94 with a handle 95, for placing the cap member 94 over the cover 4 of a sprinkler 1. The handle 95 can be made long to use in a standing position. The cover 4 has three equally spaced upstanding ear members 96 which have lifting openings 97 therein for engagement by said removal tool 101.

The cylindrical cap member 94 has a contoured recess 98 for placing over the top of the sprinkler 1 including the top 99 of nozzle housing 50 without encountering interference. The contour of the recess 98 includes three (3) equally spaced individual recesses 103 for receiving the three equally spaced upstanding ear members 96. Each recess 103 allows an angular movement of each upstanding ear member 96 therein, permitting limited rotation between the cover 4 and cylindrical cap member 94.

A projection 105 extends downwardly on the same one side of each of the recesses 103 so that the one side of each recess 103 will extend to the top of the cover 4. A rod 107 extends from each extended side of a recess 103 in a counter-clockwise direction approximately half-way into the recess 103. Each rod 107 is aligned with a cooperating lifting opening 97 of each upstanding ear member 96 when a cylindrical cap member 94 of sprinkler cover and riser assembly removal tool 101 is placed over a sprinkler 1 with each upstanding ear member 96 positioned in the open portion of each cooperating equally spaced individual recess 103 not obstructed by the rod 107.

When the removal tool 101 is turned in a counter-clockwise direction, the rods 107 enter the lifting openings 97 and the extended sides of the recesses 103 engage the upstanding ear members 96. Further turning of the removal tool 101 unlocks the cover 4 from the cylindrical housing 2, which is prevented from rotating by a lock wire 114 or by holding, by placing lugs 14 between lugs 10; the cover 4 can then be lifted off the cylindrical housing 2 with the cover 4 engaging the top 99 of the nozzle housing 50 to also remove the riser assembly 22.

The quick connect-disconnect device is constructed so that the cover 4 fits into the cylindrical housing 2, permitting the cylindrical housing 2 to be gripped when the cover 4 is turned for locking of the lugs 10 and 14 of the quick connect-disconnect device, or for unlocking them. If a lock wire 114 is used between the cylindrical housing 2 and a fixed water pipe 117, gripping will not be necessary.

To replace the cover 4 and riser assembly 22 on the sprinkler 1, a removal tool 101 is placed with its cylindrical cap member 94 over the cover 4 and riser assembly 22 with the rods 107 engaging their cooperating lifting openings 97. The riser assembly 22 is lowered in the cylindrical housing 2 with the lugs 14 of cover 4 passing between the lugs 10 of cylindrical housing 2. The removal tool 101 is then turned in a clockwise direction, removing the rods 107 from the lifting openings 97 with the regular sides of the recesses 103 engaging the upstanding ear members 96 of cover 4. Further turning of the removal tool 101 locks the cover 4 to cylindrical housing 2 by engaging the surfaces A and B of lugs 10 and 14, respectively. The removal tool 101 can then be removed since the rods 107 are disengaged from the lifting openings 97.

One rod 107 is fixed to each projection 105 for extending therefrom. Each rod 107 is formed having a short lifting section 107A and another section 107B bent at 90° thereto. The lifting section 107A fits in a groove 109 in the surface of a projection 105 with the lifting end extending over a recess 103 and with the section 107B extending through a hole 110 in the cylindrical cap member 94. The end of rod section 107B is bent over where it extends out of the hole 110 to fix the rod 107 in place. While one construction has been shown, other means can be used to support rod 107.

Elongated openings 111 are placed in the cylindrical cap member 94 to prevent any interference by a threaded locking pin 112, which might be in a raised position.

Referring to FIG. 16, a modified pop-up sprinkler 201 with dual flow is shown having a cylindrical housing 2 with a cover 4 on top thereof, with a resilient cylindrical sealing member 11 fixed therebetween as described for FIG. 3.

The riser member 16 and internal drive components of the pop-up sprinkler 1 become basically the primary flow passage means and drive means 216A of the modified dual-flow pop-up sprinkler 201, which has a housing 217 fixed in a cylindrical riser member 216 and spaced by projections 247 from the inner wall thereof to form a secondary annular flow passage 200 to the top of the riser member 216.

The primary flow passage means and drive means 216A includes the same internal drive components located in the riser member 16 of pop-up sprinkler 1. These parts are:

(1) turbine housing and inlet nozzle means 100;
(2) water drive turbine wheel 102;
(3) reduction gear drive 104; and
(4) reversing gear drive 106. One additional part, a filter 210, is added below the turbine housing and inlet nozzle means 100. This filter 210 is fixed in place and filters the primary flow entering the bottom of the primary flow passage means and drive means 216A.

The top of the primary flow passage means and drive means 216A is formed having an inwardly extending annular flange 219 on housing 217 connected to an upwardly extending shaft support 218 with a center shaft opening 20. Center shaft opening 20 receives the hollow cylindrical output shaft member 226 of reversing gear drive 106. An annular resilient sealing member 59 is located in an annular groove in the end of the upwardly extending shaft support 218 next to the hollow cylindrical output shaft member 226.

The reversing gear drive 106 is located in the housing 217 with its top against the inner surface of the annular flange 219. The reduction gear drive 104 is located below the reversing gear drive 106 and connected thereto by an output shaft 27. The reduction gear drive 104 is positioned in the housing 217 by a press fit, also positioning the reversing gear drive 106. As before, reference is made to U.S. application Ser. No. 932,470 for details.

Turbine wheel 102 is located below reduction gear drive 104 and is connected thereto by drive shaft 29 and drive pinion gear 221. The turbine housing and inlet nozzle means 100 is located below reduction gear drive 104 and encloses the turbine wheel 102. The filter 210 is located below the turbine housing and inlet nozzle means 100 and fillers the water flow into the primary flow passage means and drive means 216A.

Figure 20:
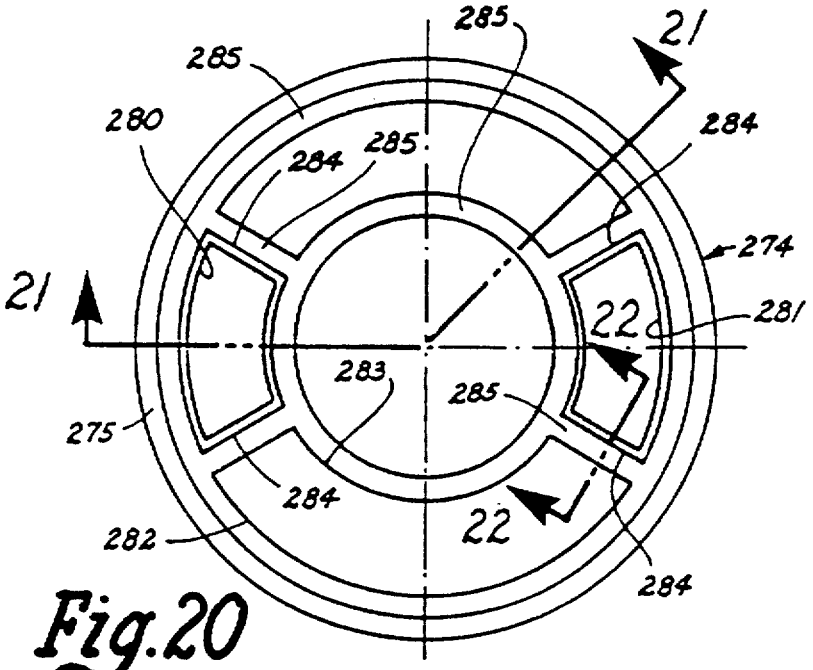
FIG. 20 is a top view of the annular secondary flow inlet insert.
Figure 22:
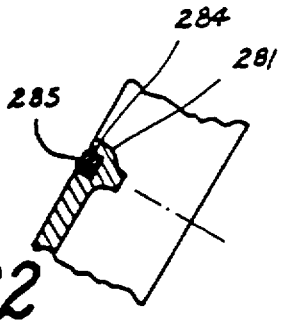
FIG. 22 is a view taken on the line 22—22 of FIG. 20.
Figure 21:
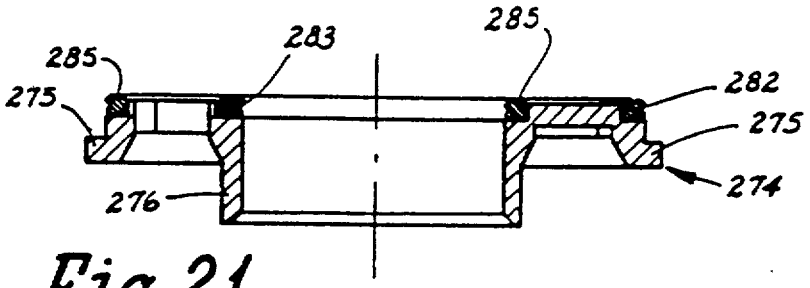
FIG. 21 is a view taken on the line 21—21 of FIG. 20.

The top of cylindrical riser member 216 has an inwardly extending annular flange 221 with a top surface for positioning even with the end of the upwardly extending shaft support 218, forming an annular opening 273 therebetween. Annular opening 273 receives an annular secondary flow inlet insert 274 (see FIGS. 20, 21 and 22).

The lower outer edge of the annular opening 273 has a groove therearound to receive a projecting annular rim 275 on the lower outer edge of annular secondary flow inlet insert 274 which limits its upward position in the annular opening 273 to place its top even with the top of the inwardly extending annular flange 221 of cylindrical riser member 216.

The lower inner edge of the annular secondary flow inlet insert 274 is elongated at 276 (see FIG. 21) to engage a raised portion on the top of the inwardly extending annular flange 219 on housing 217. This arrangement permits proper positioning of the primary flow passage means and drive means 216A in the cylindrical riser member 216, placing the end of the upwardly extending shaft support 218 even with the top of the inwardly extending annular flange 221 and the top of the annular secondary flow inlet insert 274.

The cylindrical housing 2 encloses a riser assembly 222 including the cylindrical riser member 216 and a sprinkler nozzle housing assembly 208. The sprinkler nozzle housing assembly 208 is comprised of five (5) main parts. These parts are:

(1) a nozzle housing 250;
(2) a primary nozzle 251;
(3) a secondary nozzle 252;
(4) an adjustable oscillating output control 53; and
(5) a secondary flow control plate 248.

Nozzle housing 250 is formed as a cylindrical member 249 having an outer surface approximately the same diameter as that of riser member 216. The interior of the housing 250 is formed having a solid top and upper area 255 with a lower annular open area 256 formed around a downwardly extending center projection 257. The lower part of the projection 257 is formed cylindrical in shape and extends just below the bottom edge of the cylindrical member 254 and has a cylindrical opening 258 to receive a collar 277 which is connected to the top of the exterior of the hollow cylindrical output shaft member 226. The collar 277 can be snapped on the hollow cylindrical output shaft member 226 by interlocking flange members at 290. A torque limiting lightly splined area is located between the hollow cylindrical output shaft member 226 and collar 277. Should excess external forces be put on the sprinkler nozzle housing assembly 208 to turn it, the internal drive gear mechanism will be protected by rotational slippage at the splined area. The force required for slippage can be controlled by the degree of splining. Other well known fixing means can be used.

The collar 277 has an annular bottom with a sealing bead therearound to seal with the annular resilient sealing member 59 located in the end of shaft support 218 adjacent the hollow cylindrical output shaft member 226. An O-ring seal is located between the collar 277 and cylindrical opening 258. The collar 277 is fixed to the cylindrical part of projection 257 by a pin 60.

The inner lower end of the cylindrical member 254 has an inwardly extending annular flange 278 with a lower surface even with the lower end of the lower part of the projection 257 which is cylindrical in shape. An annular opening 279 is formed between the cylindrical lower part of the projection 257 and the inner end of the inwardly extending annular flange 278. It can be seen that the annular opening 279 is located over the top of the fixed annular secondary flow inlet insert 274. The annular top of the annular secondary flow inlet insert 274 is formed having two open arcuate inlet ports 280 and 281 while the remainder is closed. An annular groove 282 (see FIG. 22) is formed around the upper outer edge and an annular groove 283 is formed around the upper inner edge of annular secondary flow inlet insert 274. Radial grooves 284 are formed connecting the annular grooves 282 and 283 on each end of the two open arcuate inlet ports 280 and 281. These two open arcuate inlet ports 280 and 281 form the secondary flow inlets to the sprinkler nozzle housing assembly 208. A composite seal member 285 extends in all of the annular grooves 282, 283 and radial grooves 284. The annular portions and radial portions of the composite seal member 285 extend above the top of the annular secondary flow inlet insert 274 for sealing engagement with a rotatable secondary valving flow control plate 248.

Secondary flow control plate 248 is positioned over the annular opening 279. The inner circular edge of the secondary flow control plate 248 is bent to form a short cylindrical flange 286 and the outer circular edge of the secondary flow control plate 248 is also bent to form a short cylindrical flange 287. The short cylindrical flange 286 is fixed in a cylindrical slot in the lower cylindrical end of the downwardly extending center projection 257 and the short cylindrical flange 287 is fixed in a cylindrical slot in the inner end of inwardly extending annular flange 278. Other fixing means can be used.

The secondary valving flow control plate 248 has arcuate valving openings 288 and 289 placed therein to direct selected secondary flow from the two arcuate inlet ports 280 and 281 to the lower annular open area 256 where it can enter secondary nozzle 252. The composite seal member 285 seals the flow between the two arcuate inlet ports 280 and 281 of the annular secondary flow inlet insert 274 and the arcuate valving openings 288 and 289 of the secondary flow control plate 248. The arcuate inlet ports 280 and 281 can be preselected (i.e., varied in size, number, shape, etc.) to cooperate with preselected (i.e., varied in size, number, shape, etc.) arcuate valving openings 288 and 289 to obtain a desired flow pattern through secondary nozzle 252 to add to the circular pattern attained by the primary nozzle 251. An example will be hereinafter disclosed.

The upper part of the downwardly extending center projection 257 has an open area 261 connected to the top of the cylindrical opening 258. An angular projection 262 extends upwardly from center projection 257 and joins solid upper area 255; a cylindrical bore 263 is formed in said angular projection 262 and an aligned opening 264 is formed in the outer surface of cylindrical member 254. A nozzle 251 is inserted through the opening 264 into cylindrical bore 263 where it is fixed in place by gluing. Other fixing means can be used. Primary water flow entering open area 261 through hollow cylindrical ouput shaft member 226 will flow through primary nozzle 251.

Open area 261 has a cylindrical bore 66 extending upwardly in axial alignment with lower cylindrical opening 258 for a short distance, with a smaller axially aligned cylindrical bore 67 extending through the top of the nozzle housing 250. Cylindrical bore 66 and smaller cylindrical bore 67 house a cylindrical member 68 and cylindrical member 69, respectively, along with an annular O-ring seal 70. The top of the cylindrical member 69 has an adjusting slot 71 for setting the desired oscillating angle for the sprinkler. An arrowhead 72 indicates the direction that the nozzles 251 and 252 are pointing. A rod 116 extends from the cylindrical member 68 to the reversing gear drive 106 to change the angular movement of the nozzles 251 and 252.

Figure 17:
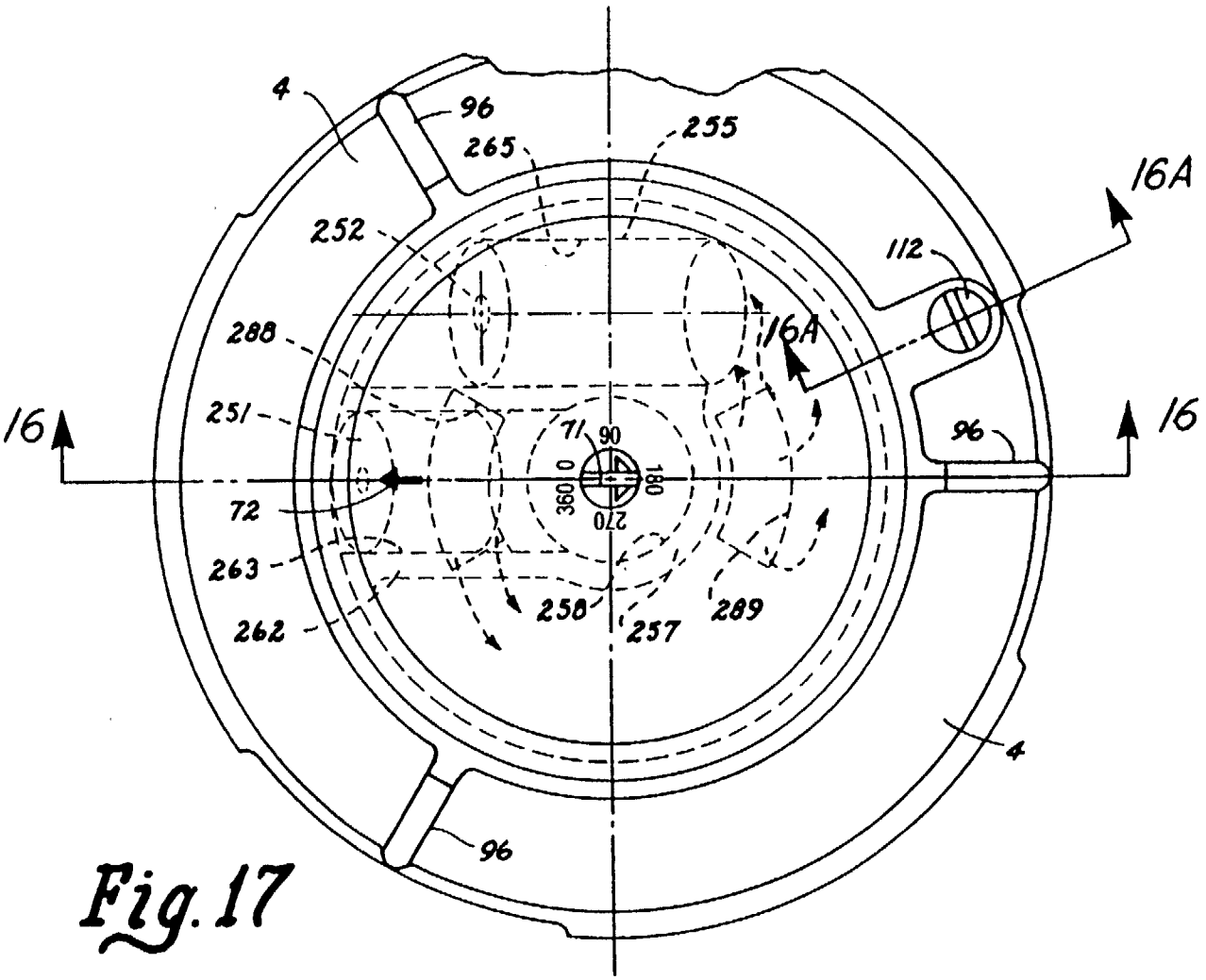
FIG. 17 is a top view of the modified sprinkler of FIG. 16 showing the cover and axially movable center nozzle housing assembly with the primary and secondary nozzles shown by dotted lines in their cylindrical bores in the solid top and upper area of the nozzle housing along with the openings in the secondary flow control plate.
Figure 18:
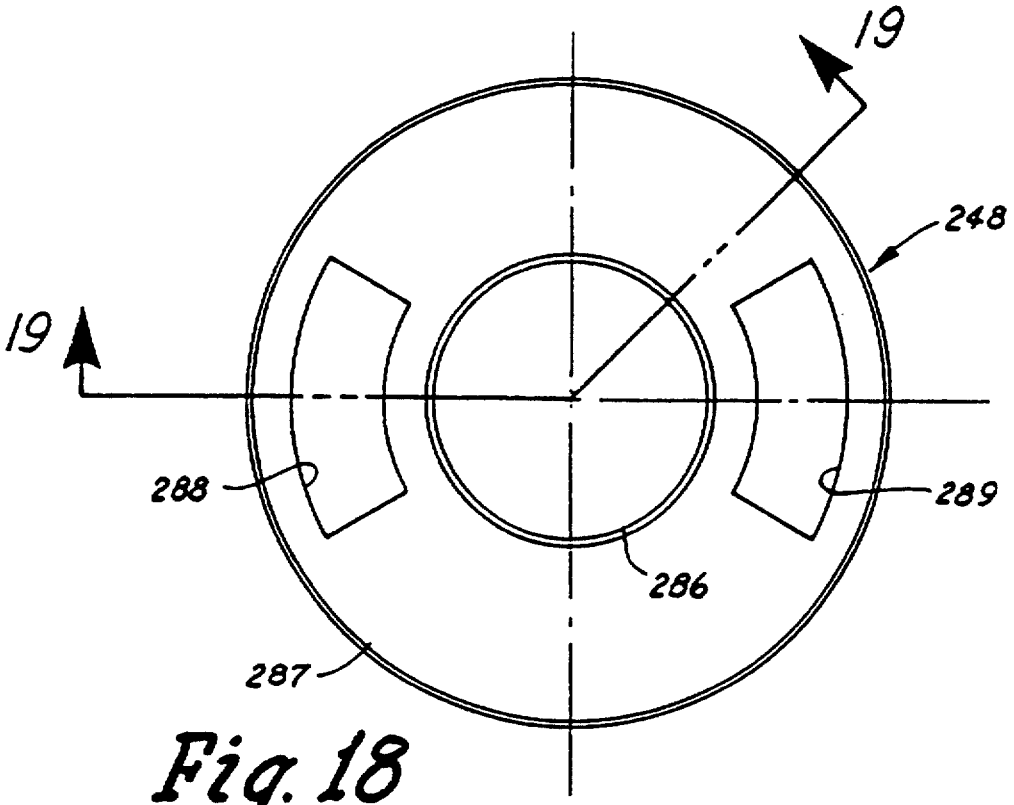
FIG. 18 is a top view of a secondary flow control plate.
Figure 19:
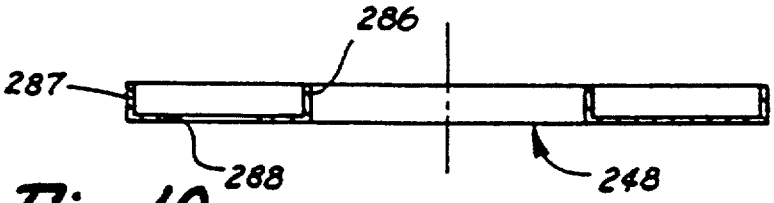
FIG. 19 is a view taken on the line 19—19 of FIG. 18.

The solid upper area 255 has a cylindrical bore 265 formed therein to the side (see FIG. 17) of the cylindrical bore 263 and has an aligned opening in the outer surface of cylindrical member 254 where the cylindrical bore 265 exits. A nozzle 252 is inserted through the aligned opening into cylindrical bore 265 where it is fixed in place by gluing. Other means can be used. Secondary water flow entering the lower annular open area 256 through openings 288 and 289 will flow through secondary nozzle 252.

Figure 23:
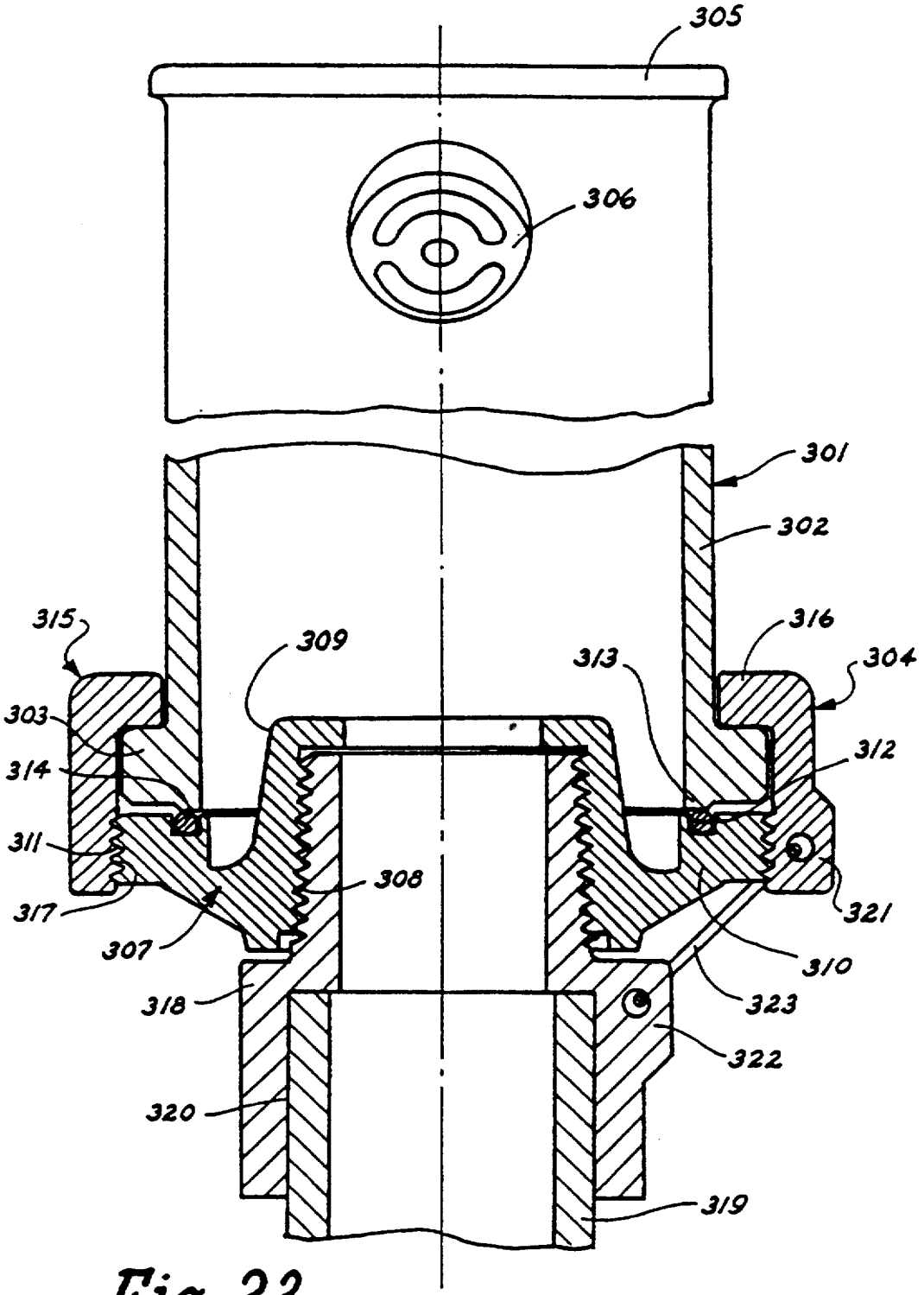
FIG. 23 is a fragmentary view partially in section of a non-pop-up sprinkler with anti-vandal locking wire and adjustable rotatable housing.

A non-pop-up sprinkler 301 having a fixed length is shown in FIG. 23. The sprinkler 301 is formed having a hollow cylindrical riser member 302 with an annular outwardly extending flange 303 at the bottom thereof.

Hollow cylindrical member 302 has a top 305 and a nozzle 306 positioned on the side near the top. A housing 304 encloses the annular outwardly extending flange 303.

Housing 304 has a bottom member 307 with an internally threaded inlet 308 in a short hollow cylindrical member 309. The internally threaded inlet 308 is for connection with a water inlet pipe connection. A threaded connector 318 is shown threaded to the housing 304 with an inlet pipe 319 fixed thereto at 320. An annular flange 310 extends outwardly from the short hollow cylindrical member 309 to a point just outwardly from the outer periphery of the flange 303. The annular flange 310 has external threads 311 around its outer periphery and has an annular groove 312 facing an annular bead 313 extending downwardly from the bottom of the flange 303. Annular bead 313 is sized to enter the annular groove 312. A resilient O-ring 314 is located in the annular groove 312 and extends out of the groove 312 to seal with the mating annular bead 313.

Housing 304 has an annular top member 315 having an internally extending annular flange 316 at the top thereof to engage the top of the annular outwardly extending flange 303 and internal threads 317 at the bottom thereof to mate with the external threads 311.

In operation, it can be seen that the tightening movement of the top member 315 will force the annular bead 313 against the resilient O-ring 314 to provide a sealing action. This connection also provides for the turning of the cylindrical riser member 302 in relation to the housing 304.

A locking lug 321 having an opening is provided on the bottom of the annular top member 315 externally of the threads 317 and a locking lug 322 is provided on the outer surface of the threaded connector 318 so that the sprinkler 301 can be lock wired by a wire 323 to the ground water piping system. While the locking lug 322 is shown on the connector 318, the wire 323 can be connected to another fixed part, such as the inlet pipe 319, which will keep the housing 304 from turning. This lock wire connection provides (1) for easy turning of the riser member 302 for directionally positioning the nozzle 306; and (2) a deterrent to unauthorized removal, including theft.

Figure 25:
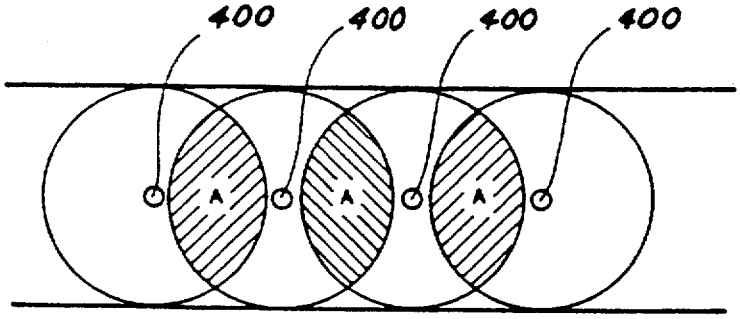
FIG. 25 is a conventional in-line sprinkler pattern layout with single flow sprinklers having centers at 55% of the sprinkler's coverage diameter.

FIG. 25 shows an installation of conventional sprinklers 400 in a line for a relatively narrow width-to-length installation, such as along roadways and islands between houses or highways. A sprinkler spacing used is 55% of the sprinkler diameter in order to get adequate coverage along the outside. This results in double-watering of the shaded areas A and an increased total water usage of 33% (133% of what would be required for uniform precipitation coverage). Since most of the available sprinklers on the market today have uniform distance patterns around the sprinkler, the overlapping coverage is tolerated.

Figure 26:
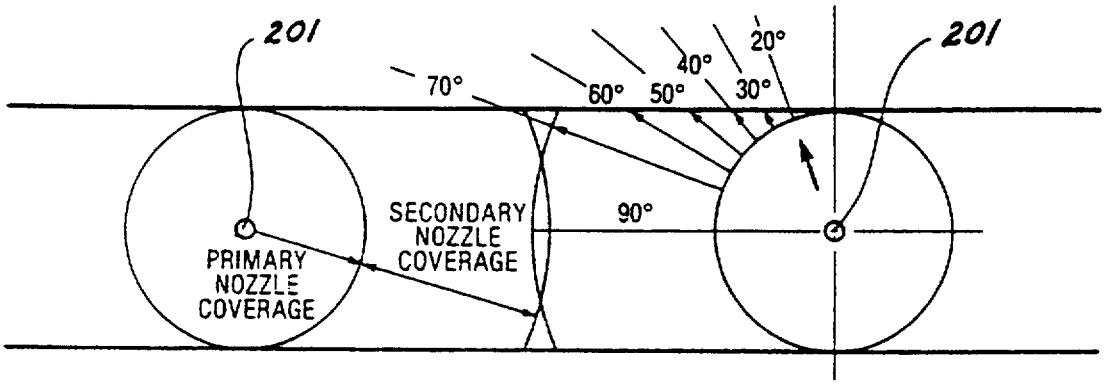
FIG. 26 is an in-line sprinkler pattern layout using programmed dual-flow sprinklers as shown in FIG. 16, each having a secondary flow control as shown in FIG. 24.

FIG. 26 shows an installation of the disclosed dual-flow, primary flow and secondary flow, sprinklers 201 (see FIG. 16) having programmable flow control of the secondary nozzle 252 by the use of the secondary flow control plate 248 and annular secondary flow inlet insert 274. It can be seen that the number of sprinklers needed is less, using the same water source. If greater coverage overlap is desired, the sprinklers 201 can be moved closer together. In this installation, the dual-flow sprinkler 201 with secondary flow control is able to take advantage of the available maximum range by turning on and off the secondary nozzle 252 to provide a programmed coverage range to cover the extended length area beyond the area covered by the primary nozzle 251. Since the range covered by the primary nozzle 251 is less and it flows all of the time the sprinkler is running, it is used to provide the drive power of the sprinkler with a pressure drop across the water drive turbine wheel 102. The pressure of the secondary nozzle flow is not affected by pressure losses through the turbine wheel 102.

Figure 24:
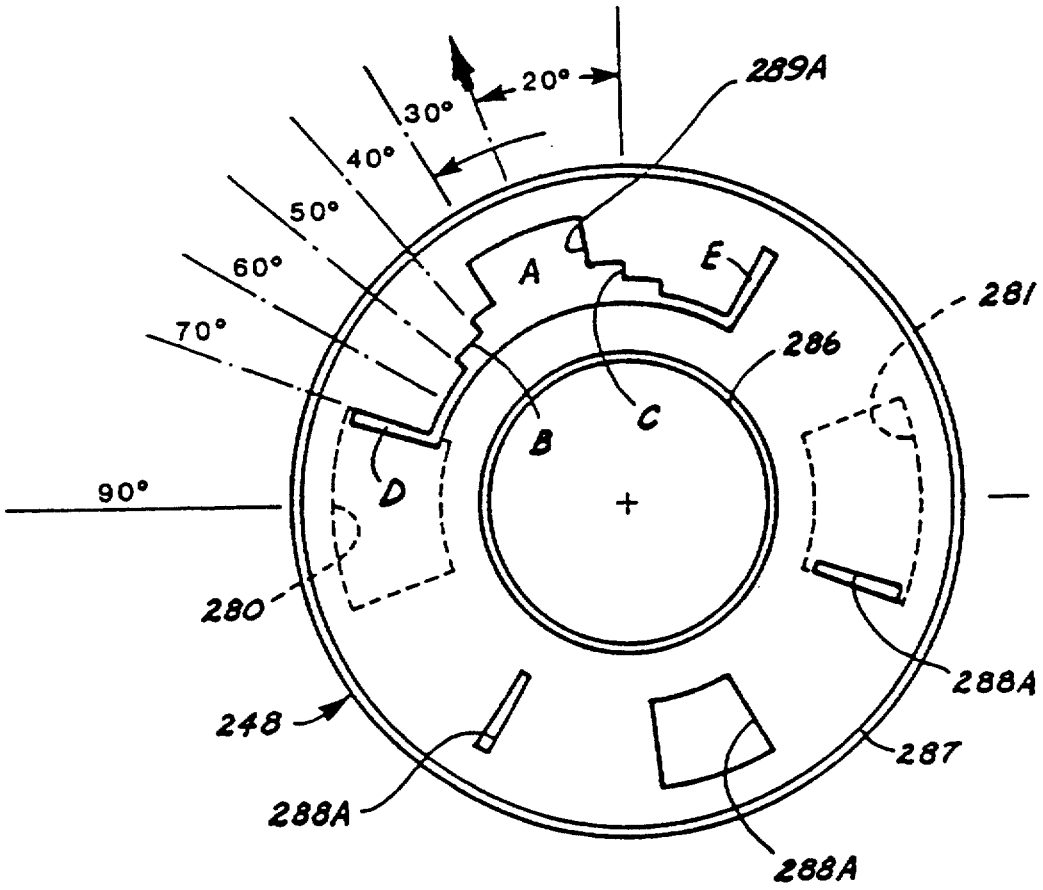
FIG. 24 is a top view of a secondary flow control plate having specific arcuate valving openings to cooperate with specific arcuate inlet ports (shown by the dashed lines) to provide extended coverage in two directions as shown in FIG. 26.

In FIG. 24, the arcuate valving opening 289A is contoured to obtain a programmed pattern as shown in FIG. 26 through secondary nozzle 252 to add to the circular pattern attained by the primary nozzle 251. Arcuate valving openings 288A are provided to obtain greater flow at selected angular positions in relation to arcuate valving opening 289A.

The arcuate inlet ports 280 and 281 are selected having an arc to permit the water flow to reach the proper width of the strip to be covered at a maximum range through a selected center arcuate valving opening section A to add to the circular pattern attained by the primary nozzle 251; to provide the proper flow and range at various angular positions to complete the coverage on either side of the area covered by the arcuate valving opening section A, the arcuate valving opening is reduced on either side of section A by sections B and C, each having three steps; the three steps of section B cause an increase in flow up to section A and the three steps of section C cause a decrease in flow after section A; an enlarged opening section D is provided at the end of section B to start the secondary flow rapidly and an enlarged opening section E is provided at the end of section C to maintain proper flow to the end. Valving opening 289A can be continuously contoured instead of the stepped fashion that is shown, to obtain similar results.

Figure 27:
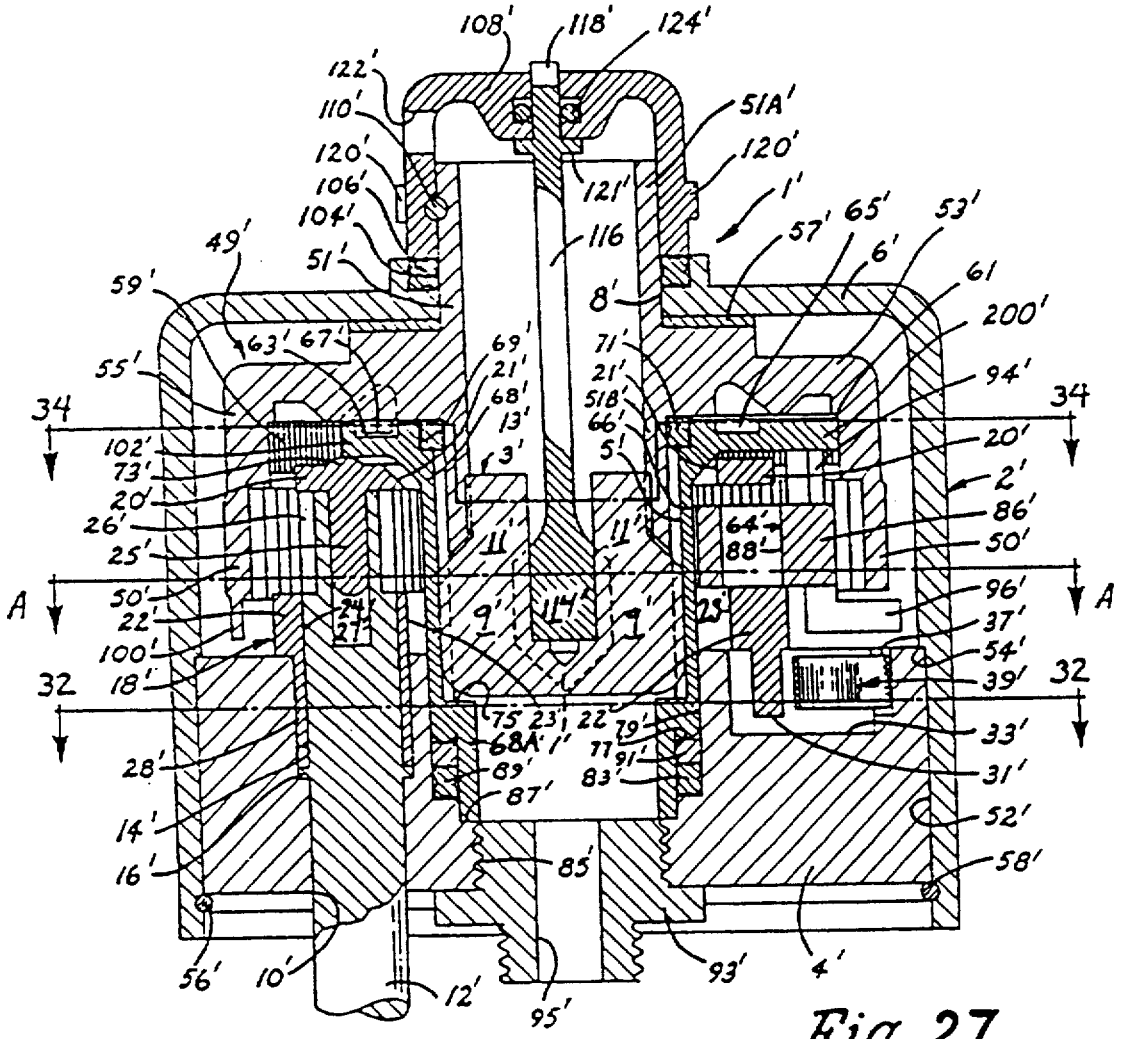
FIG. 27 is an elevational view in section of a transmission device showing the input drive shaft and output cap, the reversing gear cage and reversing toggle being positioned as shown in FIG. 34, with the reversing gear cage spring means shown in full where it engages the base member.

Referring to FIG. 27 of the drawings, a transmission device 1' is shown having a cylindrical housing 2' positioned over and fixed to a base member 4'. Cylindrical housing 2' has an integral cover 6' having a center outlet opening 8' for a purpose to be hereinafter described. The end of cylindrical housing 2' over base member 4' has a circumference of an increased inner diameter forming an annular step 54'. Base member 4' is positioned in the increased diameter 52' of cylindrical housing 2' against the annular step 54' and an internal snap ring 56' is placed in an annular groove 58' in the circumference or increased inner diameter 52' formed at the bottom of base member 4' to fix it in place. Other holding means can be used.

Base member 4' has an opening 10' therethrough positioned to one side for receiving a rotary input shaft 12'. Rotary input shaft 12' can be driven by any means desired, such as an electric motor, manual means, fluid turbine, etc. The upper part 14' of the opening 10' is enlarged to receive an annular flange 16' on the input shaft 12'. A reversing gear cage 18' is positioned within said cylindrical housing 2' adjacent said base member 4' and the reversing gear cage 18' is formed having a top plate 20' and a bottom plate 22' with cooperating center openings 21' and 23', respectively. The bottom plate 22' has an opening 24' therein to receive the rotary input shaft 12', the upper end of which is formed as a spur gear 26'. A cylindrical shaft 28' extends downwardly from the bottom of the bottom plate 22' around opening 24' and extends into the upper part 14' of the opening 10' to provide for pivotal movement of the reversing gear cage 18' while the cylindrical shaft 28' properly positions the input shaft 12' and spur gear 26' above the top of the bottom plate 22' by enclosing the annular flange 16'. An integral shaft 25' extends downwardly from the bottom of top plate 20' to engage a cylindrical opening 27' extending downwardly from the top of input shaft 12' through the centerline of the spur gear 26'.

Figure 29:
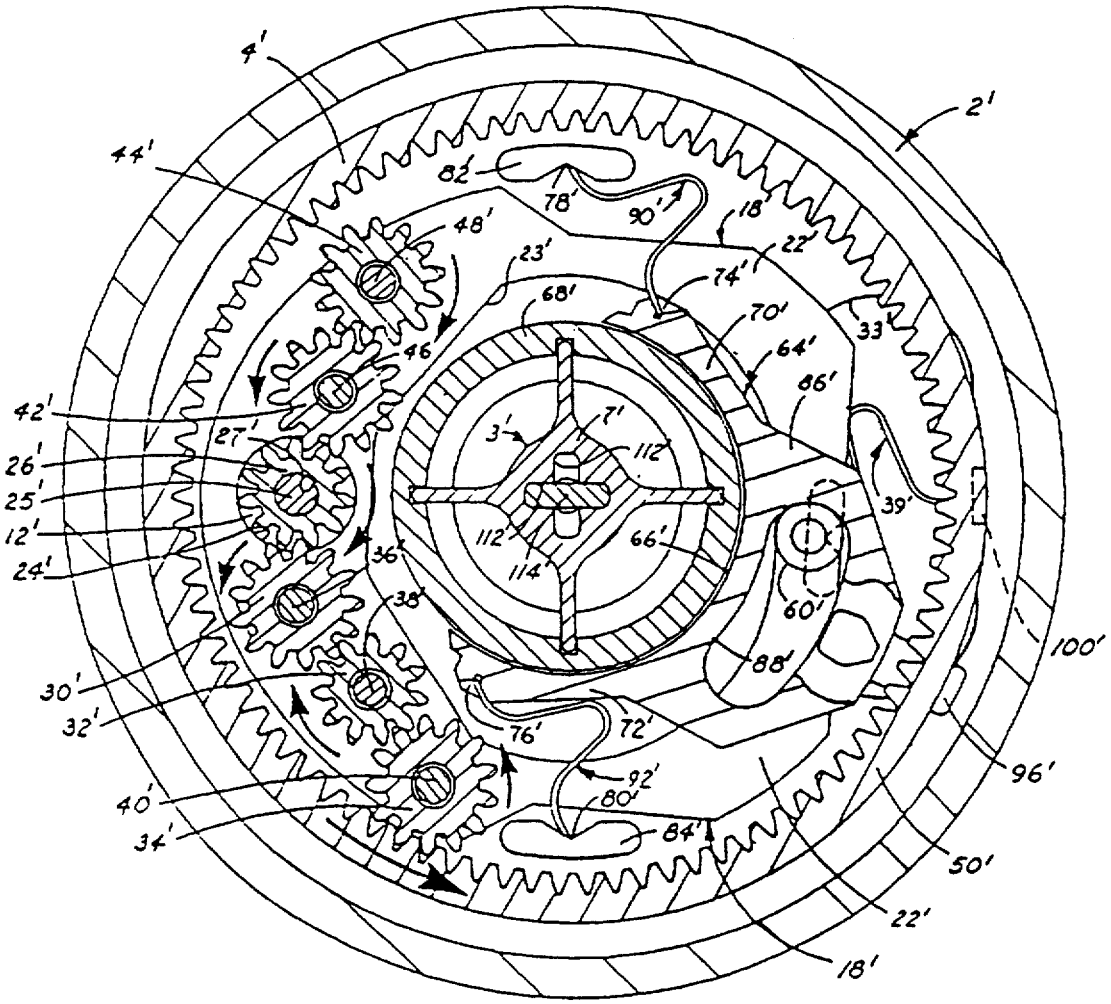
FIG. 29 is a transverse sectional view of the transmission device taken along a plane represented by the line A—A of FIG. 27 showing the reversing gear cage and reversing toggle, each biased clockwise to one side with a driving gear of the reversing gear cage engaging the ring gear on the output member for counter-clockwise drive.
Figure 30:
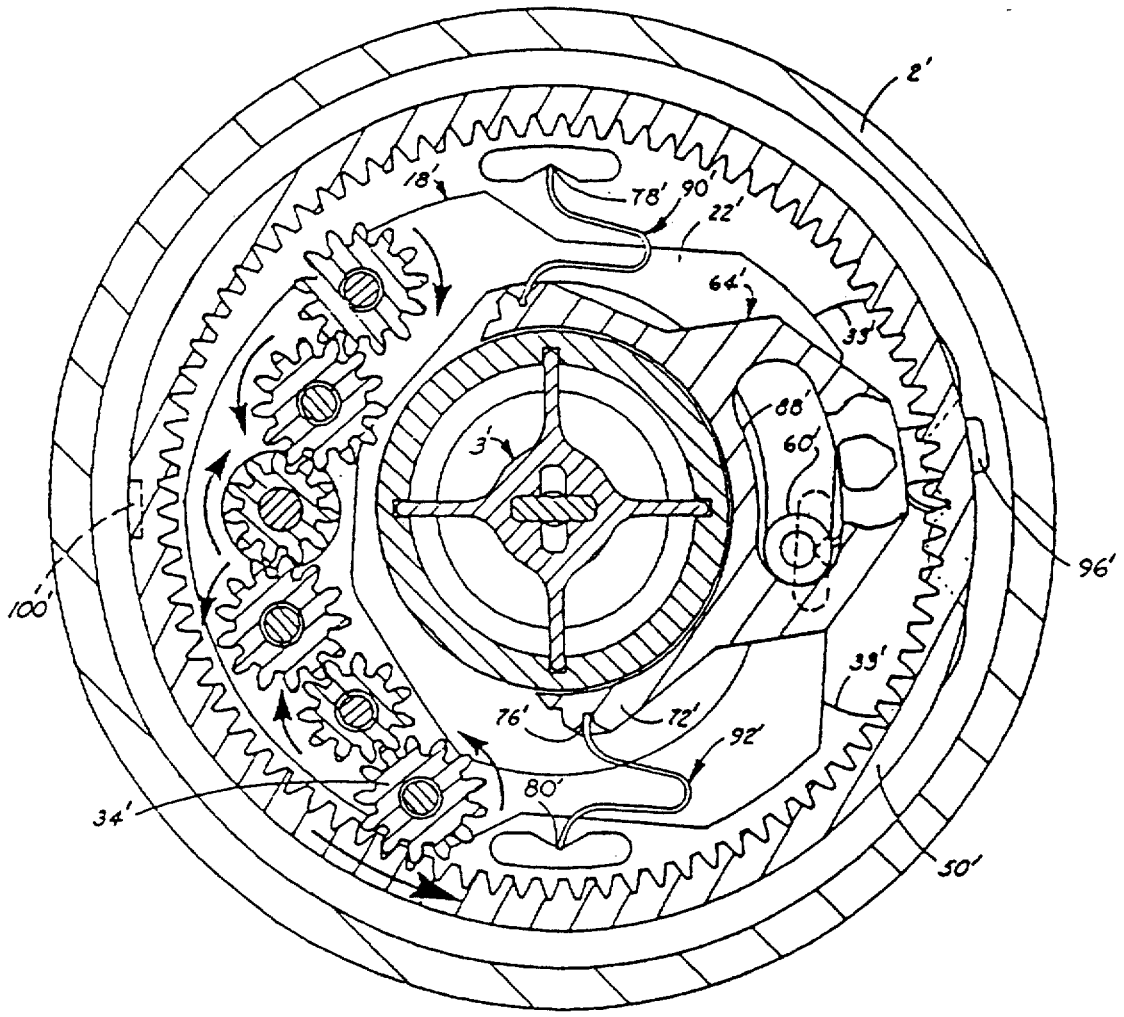
FIG. 30 is a transverse sectional view of the transmission device taken along a plane represented by the line A—A of FIG. 27 showing the reversing toggle forced counter-clockwise to a position where the reversing toggle has just passed over a center line reversing the biasing forces on said reversing toggle.
Figure 31:
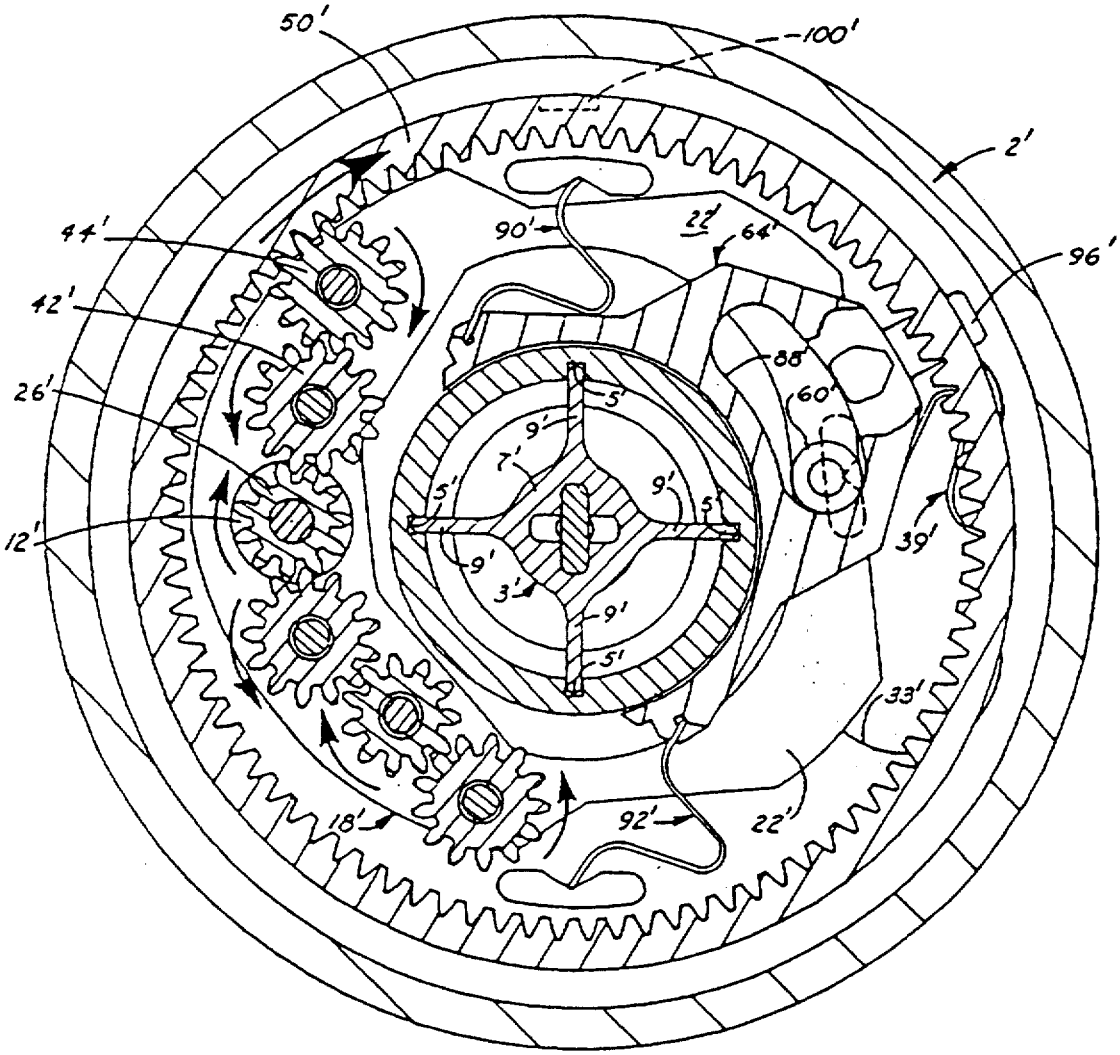
FIG. 31 is a transverse sectional view of the transmission device taken along a plane represented by the line A—A of FIG. 27 showing the reversing gear cage and reversing toggle, each biased counter-clockwise to the other side with an opposite driving gear of the reversing gear cage engaging the ring gear on the output member for clockwise drive.
Figure 32:
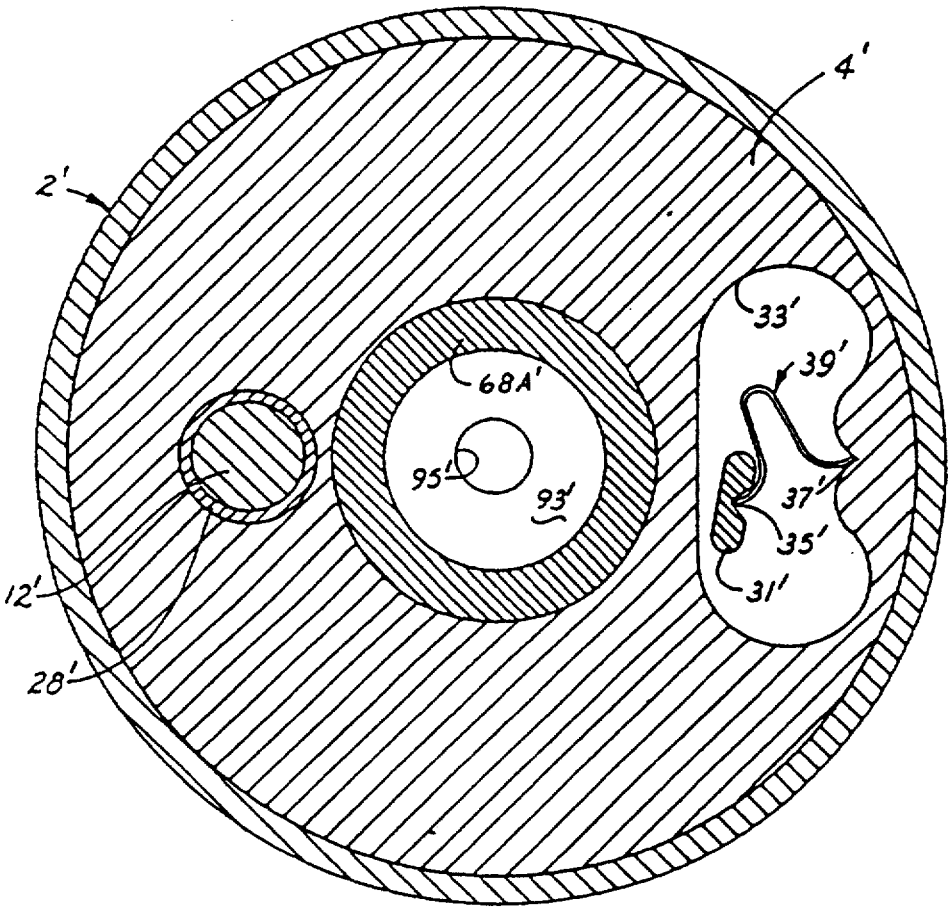
FIG. 32 is a transverse sectional view of the transmission device taken along the line 32—32 of FIG. 27 showing the overcenter spring means for the reversing gear cage.

As shown in FIGS. 29, 30, and 31, three gears 30', 32' and 34' are mounted on integral shafts 36', 38' and 40' extending downwardly from top plate 20' of the reversing gear cage 18' and they extend in a counter-clockwise direction from the integral shaft 25'. Integral shaft 36' is positioned so that gear 30' will engage the spur gear 26'; shaft 38' is positioned so that gear 32' will engage gear 30'; and shaft 40' is positioned so that gear 34' engages gear 32' and extends outwardly over the edges of top plate 20' and bottom plate 22' so that it can drivingly engage an output ring gear 50', encircling the reversing gear cage 18' between the top plate 20' and bottom plate 22'. Output ring gear 50' is formed as a part of output member 49'. Output member 49' will be hereinafter discussed as to its structure and use.

Two gears 42' and 44' are mounted on integral shafts 46' and 48' extending downwardly from top plate 20' of the reversing gear cage 18' and they extend in a clockwise direction from the integral shaft 25'. Integral shaft 46' is positioned so that gear 42' will engage the spur gear 26' and shaft 48' is positioned so that gear 44' engages gear 42' and extends outwardly over the edges of top plate 20' and bottom plate 22' so that it can drivingly engage said output ring gear 50'. Integral shafts 36', 38', 40', 46' and 48' of top plate 20' extend into matched openings in bottom plate 22' and have a snap engagement at their ends with said openings to fix said top plate 20' and bottom plate 22' of the reversing gear cage 18' together.

A hollow actuating post 60' extends upwardly from the top of the bottom plate 22' at a point on the other side of the center opening 23' from the opening 24', and on a radial line passing through the center of the opening 24'; said arrangement permits arcuate movement of hollow actuating post 60' about the center of opening 24', cylindrical shaft 28' and spur gear 26' as reversing gear cage 18' is moved between its clockwise driving position and counter-clockwise driving position. A short integral shaft 62' extends downwardly from the bottom of top plate 20' to have snap engagement with the hollow actuating post 60'.

It can be seen that when the reversing gear cage 18' is positioned clockwise around input shaft 12', as shown in FIG. 29, the gear 34' is engaging the ring gear 50'. With the rotary input shaft 12' being driven clockwise, the two idler gears 30' and 32' will rotate drive gear 34' counter-clockwise, imparting a counter-clockwise rotation to output ring gear 50'. When the reversing gear cage 18' is positioned counter-clockwise around input shaft 12', as shown in FIG. 31, the gear 44' is engaging the ring gear 50'. With the rotary input shaft 12' being driven, clockwise, the one idler gear 42' will rotate the drive gear 44' clockwise, imparting a clockwise rotation to output ring gear 50'.

To bias the reversing gear cage 18' in a clockwise direction to have gear 34' engage ring gear 50', or bias the reversing gear cage 18' in a counter-clockwise direction to have gear 44' engage ring gear 50' for oscillating movement of output ring gear 50', a reversing toggle device 64' is positioned between the top plate 20' and bottom plate 22' of reversing gear cage 18'. The reversing toggle device 64' is formed having a C-shape with an arcuate inner surface 66' greater than 180° for rotation about a cylindrical member 68', extending through the center openings 21' and 23' of top plate 20' and bottom plate 22' of reversing gear cage 18'. Cylindrical member 68' will be hereinafter discussed as to its structure and use.

The C-shape of reversing toggle device 64' has two arms 70' and 72' with spring seat notches on their outer surface at 74' and 76', respectively; said spring seat notches 74' and 76' being 180° apart. Cooperating spring seat notches 78' and 80' are placed on projections 82' and 84', extending upwardly from the top surface of base member 4', adjacent the gear teeth of output ring gear 50'. The spring seat notches 78' and 80' are located on a diametrical line through the centerline of the cylindrical housing 2', said diametrical line being 90° to a line passing between the center of opening 24' of bottom plate 22' and the centerline of the cylindrical housing 2'.

An overcenter spring means 90' extends between spring seat notch 74' on reversing toggle device 64' and spring seat notch 78' on projection 82' of base member 4', and a cooperating overcenter spring means 92' extends between spring seat notch 76' on reversing toggle device 64' and spring seat notch 80' on projection 84' of base member 4'. Spring means 90' and 92' bias reversing toggle device 64' in a clockwise direction as viewed in FIG. 29, and in a counter-clockwise direction as viewed in FIG. 31. The action of these spring means 90' and 92' reverses when seat notches 74' and 76' pass on either side of a centerline passing through the spring seat notches 78' and 80'.

Reversing toggle device 64' has a relatively wide radial arm 86' extending outwardly from the center portion thereof between the arms 70' and 72', to a location spaced inwardly from the gear teeth of ring gear 50'. An arcuate opening 88' is placed in said radial arm 86' at a radius to receive the hollow actuating post 60' of the reversing gear cage 18'.

Movement of toggle device 64' in either clockwise or counter-clockwise direction to just over its centerline position, reverses the biasing direction of each overcenter spring means 90' and 92', changing the biased position of toggle device 64'. Toggle device 64' has an end of arcuate opening 88' which contacts hollow actuating post 60' to bias the reversing gear cage 18' in the same direction as the toggle device 64' changing the reversing gear cage 18' drive connection to output ring gear 50'. It can be seen that this movement of toggle device 64' controls movement of reversing gear cage 18' between clockwise and counter-clockwise movement.

The radial arm 86' of reversing toggle device 64' has an upstanding projection 94' for rotating said toggle device 64' in a counter-clockwise direction and an outwardly extending radial projection 96' for rotating said toggle device 64' in a clockwise direction to move it to the overcenter position where the overcenter spring means 90' and 92' take over arid bias the toggle device 64' and, in turn, reversing gear cage 18' to its engaged position with output ring gear 50'. Upstanding projection 94' extends upwardly from the end of the top of radial arm 86' to a point above the teeth of the ring gear, and the outwardly extending radial projection 96' extends from the bottom of the radial arm 86' and under the output ring gear 50' adjacent its lower edge. Actuation of projection 94' and 96' will be hereinafter described.

To maintain a biasing force on reversing gear cage 18' at all times, to keep a driving gear 34' or 44' into engagement with ring gear 50', a downwardly projecting member 31' is located on the bottom of bottom plate 22' of the reversing gear cage 18' and extends into a recess 33' formed in the top of base member 4'. Downwardly projecting member 31' is positioned below the actuating post 60' with a spring seat notch 35' facing outwardly along a radial line through the center of cylindrical shaft 28'. A cooperating spring seat notch 37' is positioned on the outer wall of recess 33' on a line passing through the center of cylindrical shaft 28' and the center of the cylindrical housing 2'. An overcenter spring means 39' extends between spring seat notch 35' on downwardly projecting member 31' and spring seat notch 37' on the outer wall of recess 33'. Overcenter spring means 39' (and spring means 90' and 92') are formed from ribbon-like spring material, for example, steel, and shaped with an intermediate arcuate portion and oppositely directed straight portions to engage spring seat notches. Each end of the straight portions have serrations 41' to grip the spring seat notches. Overcenter spring means of this type, and others, are shown in U.S. Pat. Nos. 3,713,584; 3,724,757; and 3,107,056. Other types of overcenter spring means can be used. The biasing force of overcenter spring means 39' is made less than the combined biasing force of overcenter spring means 90' and 92', so that overcenter spring means 39' will only maintain the driving gear of reversing gear cage 18' in engagement until the overcenter spring means 90' and 92' actually go over center and force the toggle device 64' to the other side, the toggle device 64' contacting the actuating post 60' of the reversing gear cage 18' to carry the reversing gear cage 18' with it, breaking loose the driving gear from ring gear 50', at which time spring means 90' and 92' overpower the spring means 39', carrying the gear cage 18' over center to reverse the biasing force of spring means 39', spring means 90', 92', and 39', biasing the opposite driving gear of gear cage 18' into engagement. This prevents the reversing gear cage 18' from becoming positioned with both drive gears 34' and 44' out of engagement with ring gear 50'. The reversing gear cage spring means 39' thus ensures that the drive gear of the reversing gear cage 18' remains engaged with ring gear 50' during stopping and starting torque changes through the range of rotational arcs where the gear cage 18' is not biased by the toggle device 64' loading against post 60' to hold the drive tram in engagement.

Output ring gear 50' and cylindrical member 68' are mounted for rotation with each other in cylindrical housing 2' in either a clockwise or counter-clockwise direction. A fixed projection 100' extends downwardly from the bottom edge of output ring gear 50' to contact the outwardly extending radial projection 96' when ring gear 50' is being driven in a clockwise direction by gear 44' of reversing gear cage 18' (see FIG. 31). This movement of radial projection 96', as described hereinbefore, moves toggle device 64' just over its centerline position and spring means 90' and 92' take over as the driving engagement of gear 44' is broken and spring means 90' and 92' overpower the reversing gear cage biasing spring means 39', to bias toggle device 64' and reversing gear cage 18'to its opposite position to engage gear 34' and drive ring gear 50' in a counter-clockwise direction (see FIG. 29).

An angularly adjustable radial projection 200' extends radially from an annular flange 102' on top of cylindrical member 68' to contact the upstanding projection 94' of toggle device 64' when ring gear 50' and annular flange 102' are being driven in a counter-clockwise direction by gear 34' of reversing gear cage 18' (see FIG. 29). This movement of upstanding projection 94', as described hereinbefore, moves toggle device 64' just over its centerline position and spring means 90' and 92' take over, as the driving engagement of gear 34' is broken and spring means 90' and 92' overpower the reversing gear cage biasing spring means 39', to bias toggle device 64' and reversing gear cage 18' to its opposite position to engage gear 44' and drive ring gear 50' in a clockwise direction (see FIG. 34 where adjustable radial projection 200' is about to move the upstanding projection 94' over its centerline position). The cooperation between ring gear 50' and annular flange 102' will be hereinafter described.

Output member 49' includes a cylindrical shaft member 51' with a radial flange 53' extending outwardly from a midportion thereof. A cylindrical flange 55' extends downwardly from the end of the radial flange 53', with output ring gear 50' being formed at the bottom thereof. Cylindrical shaft member 51' has an upper hollow output shaft portion 51A' extending upwardly through opening 8' to the exterior of the cover 6' and a lower cooperating cylindrical portion 51B' extending into cylindrical member 68'.

The upper hollow output shaft portion 51A' forms an annular groove 104' with the top of cover 6'. An annular resilient sealing member 106' is located in said groove 104'. An output cap 108' is placed over the end of upper hollow output shaft portion 51A' with its lower end enclosing the annular resilient sealing member 106'. The output cap 108' is fixed to the upper hollow output shaft portion 51A' by a pin 110'. Other desired fixing means can be used.

The upper surface of radial flange 53' or output member 49' has a raised portion adjacent said upper hollow output shaft portion 51A' on which a thrust washer 57' is placed to engage the inner surface of integral cover 6'. The lower surface of radial flange 53' has a cooperating contour with the top surface or annular flange 102' on the top of cylindrical member 68' to limit the angular movement between the mating flanges 53' and 102'.

An annular notch 69' is formed in the inner end of annular flange 102' facing the lower surface of radial flange 53' and upper part of cylindrical portion 51B'. An annular resilient sealing member 71' is positioned in annular notch 69' to seal the gear housing from pressure in the annular passage through the central shaft area.

A slight rounded projection 73' extends from the top of top plate 20' of reversing gear cage 18' over integral shaft 25' to properly space it from the bottom of annular flange 102'.

An annular groove 63' is placed in the top surface of annular flange 102', with an integral stop member 65' being placed therein. Said integral stop member 65' is positioned in said annular groove 63' a few degrees counter-clockwise of the adjustable radial projection 200' (see FIG. 34). A cooperating stop projection 67' extends downwardly from the lower surface of radial flange 53' and projects into the annular groove 63'. It can be seen that flanges 102' and 53' have a relative angular movement of approximately 360°, the arc of travel of stop projection 67' in annular groove 63' from one side of integral stop member 65' to the other.

A plurality of serrations 59' extend around the inner circumference of cylindrical flange 55' between the radial flange 53' of output member 49' and the internal teeth of ring gear 50'. Serrations 59' are positioned to engage an angular holding pointer 61' on the adjacent end of angularly adjustable radial projection 200'.

The lower part of cylindrical member 68' is formed having a smaller cylindrical section 68A', said smaller cylindrical section 68A' forming an inner annular step 75' where it meets the upper larger portion of cylindrical member 68', and an outer rounded step 77'. To receive the lower end of cylindrical member 68' and smaller cylindrical section 68A', base member 4' has a second opening 79' therethrough axially aligned with outlet opening 8'. Second opening 79' has a small position 81' of reduced diameter forming an annular step 83', and a small end portion 85' of a further reduced diameter which is threaded forming an annular step 87'.

The upper part of cylindrical member 68' engages second opening 79' and smaller cylindrical section 68A' 40 engages the reduced diameter of portion 81' with the bottom end of smaller cylindrical section 68A' engaging annular step 87'. This forms an annular chamber between annular step 83' and outer rounded step 77'. An annular resilient sealing member 89' is placed in said chamber against annular step 83', and a seal retaining ring 91' is placed between said sealing member 89' and the rounded step 77'. This provides for proper positioning of cylindrical member 68' in cylindrical housing 2' and provides for sealing at that point. An adaptor 93' is threaded in opening 85' having an opening 95' therethrough for directing a liquid, such as water, into cylindrical section 68A', if desired.

An angular positioning member 3' interconnects the lower cooperating cylindrical portion 51B' and cylindrical member 68' to set a desired angular position therebetween to control the oscillating angular movement of upper hollow output shaft portion 51A'. Said lower cooperating cylindrical portion 51B' extends into cylindrical member 68 approximately one-half of the distance to annular step 75'. The inner surface of the upper portion of cylindrical member 68' has four equally spaced longitudinal turning grooves 5' extending from the annular notch 69' to the inner annular step 75'. Angular positioning member 3' has a centerbody 7' with four equally spaced vane members 9' thereon. The lower portion of the vane members 9' extend into the cooperating grooves 5' from the bottom thereof up to approximately the lower end of lower cooperating cylindrical portion 51B'. The vane members 9' are integrally attached to centerbody 7' up to this point. The vane members 9' then taper inwardly and extend upwardly as four individual projections 11' into the lower cooperating cylindrical portion 51B'. This cylindrical portion 51B' has serrations 13' therearound for engagement by tapered, or pointed, outer ends 15' on projections 11' to connect angular positioning member 3' to cylindrical portion 51B' of output member 49'.

Centerbody 7' of angular positioning member 3' has crossed slots 112' aligned with vane members 9' to receive the flat paddle 114' of an angular positioning or setting shaft 116. Angular positioning shaft 116 extends through output cap 108', presenting a small adjusting, or setting, slot 118' to the top of the output cap 108'; said small slot having an indicating arrowhead at one end indicating the position of the angularly adjustable radial projection 200', while an indicating arrowhead on the output cap 108' indicates the position of the fixed projection 100'. An annular flange 121' on angular positioning shaft 116 prevents the flat paddle 114' from becoming accidentally disconnected. A seal 124' extends between the output cap 108' and angular positioning shaft 116.

Gear teeth 120' are located around the output cap 108' to provide an external drive. An opening 122' is provided in output cap 108' to serve as a nozzle opening and it is aligned with the fixed projection 100'. Angular degree settings can be inscribed in the top surface of the output cap 108' to set a desired oscillating angle.

In driving operation, input shaft 12' turns clockwise driving output ring gear 50' in an oscillating motion through a predetermined angle set by adjusting slot 118'. This angle is shown as 180° in the Figures. Starting from FIG. 29, drive gear 34' is engaged with and drives ring gear 50' counter-clockwise, bringing adjustable radial projection 200' into actuating contact with upstanding projection 94' of toggle device 64', moving toggle device 64' against spring means 90', 90' past an overcenter position reversing the action of spring means 90', 92'. This biases toggle device 64' counter-clockwise for engagement with actuating post 60' of gear cage 18'. Further movement of ring gear 50' by drive gear 34' continues to move radial projection 200' against upstanding projection 94' which begins to pivot the gear cage 18' against the force of spring means 39', disengaging the drive gear 34'. The reversed action of spring means 90', 92' now overcomes the force of spring means 39', moving the spring means 39' past an overcenter position, reversing the action of spring means 39'. Spring means 39' and spring means 90', 92' now carry gear cage 18' its new clockwise driving position (see FIG. 31) with drive gear 44' engaging and driving ring gear 50' clockwise: movement of ring gear 50' clockwise bringing fixed projection 100' into actuating contact with radial projection 96' of toggle device 64', moving toggle device 64' against spring means 90', 92' past an overcenter position, reversing the action of spring means 90', 92'. This biases toggle device 64' clockwise for engagement with actuating post 60' of gear cage 18'. Further movement of ring gear 50' by drive gear 44' continues to move fixed projection 100' against radial projection 96' which begins to pivot the gear cage 18' against the force of spring means 39', disengaging drive gear 44'. The reversed action of spring means 90', 92' now overcomes the force of spring means 39', moving the spring means 39' past the overcenter position, reversing the spring means 39'. Spring means 39' and spring means 90', 92' now carry gear cage 18' back to its counter-clockwise position (see FIG. 29) with drive gear 34' engaging and driving ring gear 50' counter-clockwise. This oscillation continues as long as input shaft 12' is driven.

During the driving operation, fixed projection 100' is directly driven by ring gear 50' but angularly adjustable radial projection 200' is driven by ring gear 50' through serrations 59' and 13'. Output member 49' has an equal number of serrations 59' and 13' above ring gear 50' and in cylindrical portion 51B', respectively. Angularly adjustable radial projection 200' has the angular holding pointer 61' on its outer end providing a direct driving connection with one serration of serrations 59', so ring gear 50' can drive the angularly adjustable radial projection 200'. This angularly adjustable radial projection 200' has a special contour 204' on each side to mate with a contour 97' on upstanding projection 94'. As contour 204' is driven against contour 97', the angular holding pointer 61' is held in its proper angle setting separation 59'. This action is obtained by an angled surface 206' on the end of angularly adjustable radial projection 200' which extends outwardly in the direction of movement of the ring gear 50' to engage a mating angled surface 98' on upstanding projection 94'. These angled surfaces 206' and 98' prevent the angular holding pointer 61' from bending in the direction the serrations 59' are moving and therefore preventing a serration 59' from being pulled over the angular holding pointer 61'. This action is employed to self-lock the output cap to its last set position in both clockwise and counter-clockwise directions of movement of ring gear 50'.

Angularly adjustable radial projection 200', extending from annular flange 102', has inner cylindrical member 68' providing an indirect driving connection with serrations 13' through which ring gear 50' can drive the annular flange 102' and angularly adjustable radial projection 200'. Angular positioning member 3' interconnects lower cooperating cylindrical portion 51B' to cylindrical member 68' through serrations 13' in lower cooperating cylindrical portion 51B' and cooperating grooves 5' in cylindrical member 68'. Tapered, or pointed, outer ends 15' on projections 11' extend into serrations 13' and the ends of vane members 9' extend into the cooperating grooves 5'.

Rotation of lower cooperating cylindrical potion 51A' turns serrations 13' which then rotate the ends 15' of projections 11' of angular positioning member 3'; this rotates vane members 9' and cylindrical member 68' with its radial projection 200'. Rotation of cylindrical member 68' through serrations 13' provides for slippage prevention. As lower cooperating cylindrical portion 51A' rotates, or drives, angular positioning member 3', the ends of vane members 9' in grooves 5' are dragged slightly rearwardly by cylindrical member 68', placing a slight curve in the ends 15' of projections 11'. The serrations 13' push, or bite, into the ends 15' and tend to have a fixed relationship, and prevent slippage and overriding. This arrangement also aids in maintaining the preset angular setting indicated on the output cap 108'.

Figure 28:
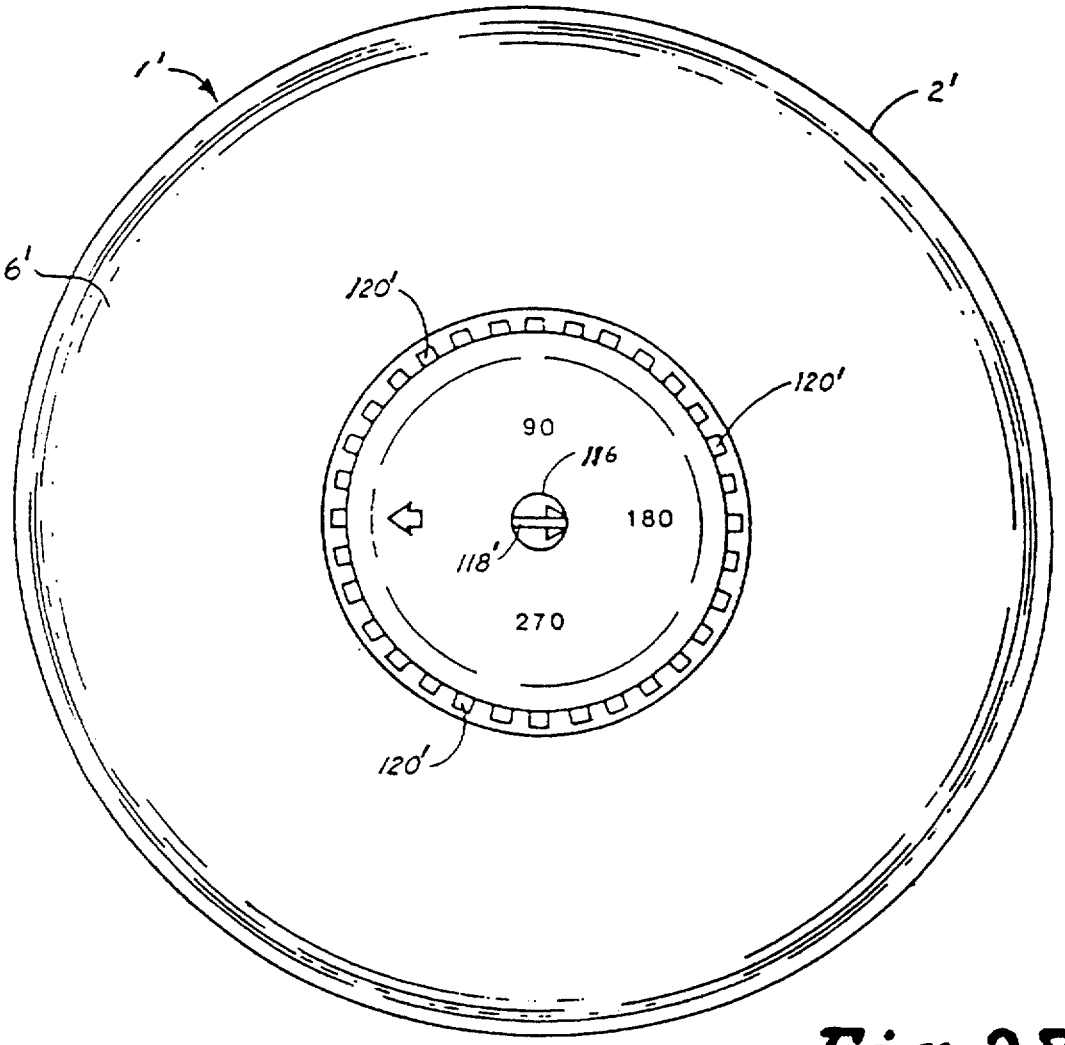
FIG. 28 is a top view of the transmission device of FIG. 27 showing the output cap and oscillating angle selector.

To set the angle between the fixed projection 100' and angularly adjustable radial projection 200', the adjusting slot 118' is observed to note the indicated angular setting. If the new desired angular setting is larger than the indicated setting, the output cap 108' can be held and the slot 118' moved clockwise to the larger desired oscillating angle. In all but one case, the angular setting can be made larger by merely holding the output cap 108' and pointing the arrowhead of slot 118' at the larger angle position. In this one case, the angle is set as described below for a smaller angular setting. In FIG. 28, if a setting of 270° is desired, since it is set at 180°, the arrowhead of slot 118' would merely be positioned to point at 270°.

Movement of slot 118' rotates setting shaft 116 and fiat paddle 114' clockwise. Flat paddle 114' rotates angular positioning member 3' and in turn cylindrical member 68' through vane members 9' and cooperating grooves 5'. Tapered outer ends 15' on projections 11' are forced over the serrations 13', aided by bending of vane members 9' by the drag on the ends of vane members 9' in grooves 5', and angular holding pointer 61' on angularly adjustable radial projection 200' is forced over the serrations 59' to a new cooperating position with the serrations for the new angular setting.

If the new desired angular setting is smaller than the indicated setting, the output cap 108' is rotated clockwise as far as it will go with cooperating stop projection 67' engaging intergal stop member 65', if it will rotate clockwise at all; if the output cap 108' cannot be rotated clockwise, it is rotated counter-clockwise as far as it will go, to actuate toggle member 64', and then rotated clockwise as far as it will go, as mentioned above. From this clockwise position the output cap 108' can be held and the slot 118' moved clockwise to the smaller desired oscillating angle.

Movement of slot 118' rotates shaft 116 and flat paddle 114' as before, to force the tapered outer ends 15' and angular holding pointer 61', over the serrations 13' and 59', respectively, to the new angular setting.

Figure 33:
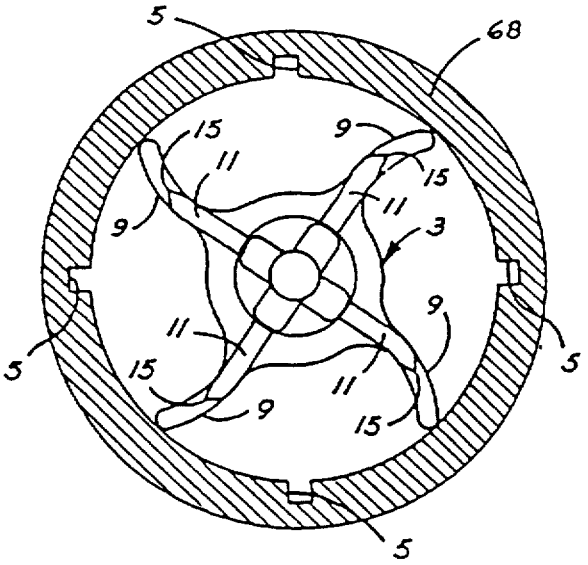
FIG. 33 is a view of the angular positioning member after its legs have become disengaged from grooves located in the cooperating cylindrical member.
Figure 35:
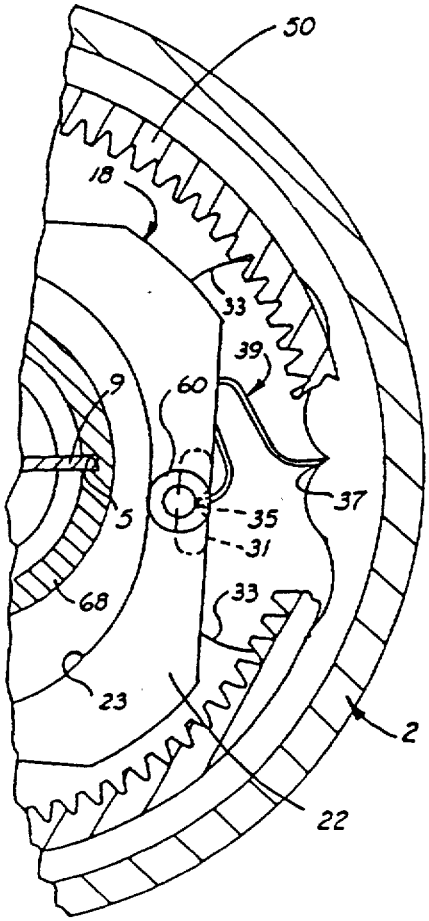
FIG. 35 is a fragmentary view of the right side of FIG. 29, with the toggle device removed and a portion of the ring gear broken away, to show the relation of the actuating post and downwardly projecting member of the reversing gear cage and gear cage overcenter spring means.
Figure 34:
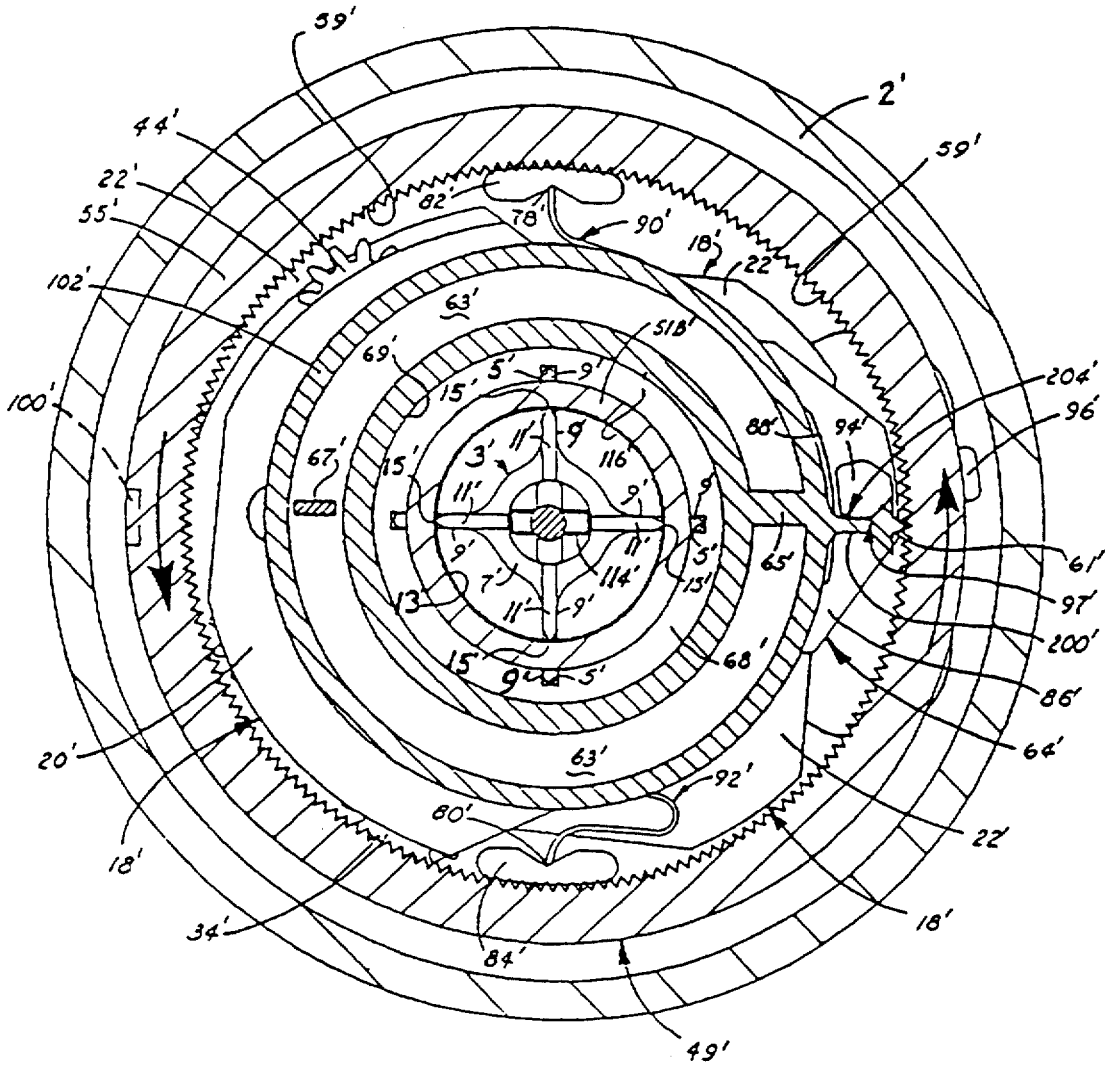
FIG. 34 is a transverse sectional view of the transmission device taken along the line 34—34 of FIG. 27 with the seal removed between the cooperating cylindrical member and output member, the position of the reversing gear cage and reversing toggle being the same as shown in FIG. 27 and FIG. 30.
Figure 36:
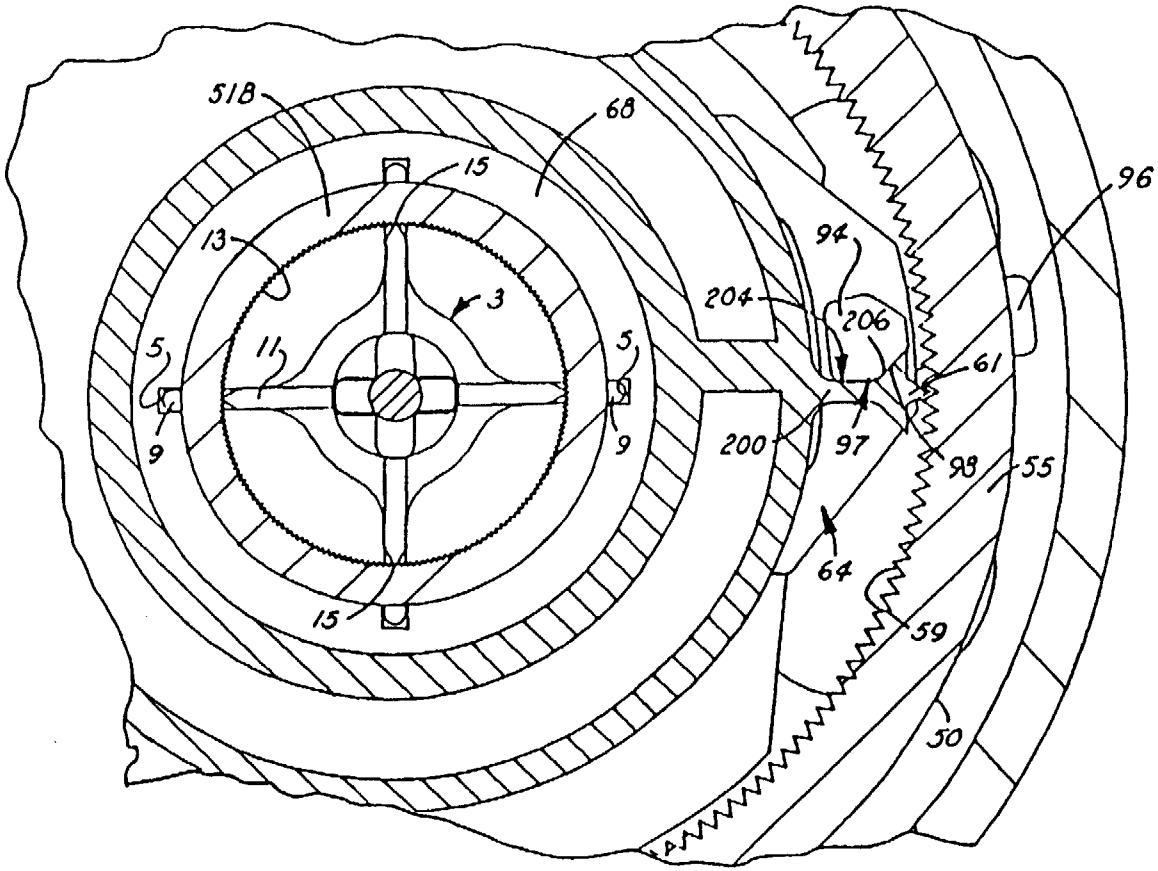
FIG. 36 is an enlarged view of the center part of FIG. 34, along with the angular adjustable radial projection, showing the connecting serrations.
Figure 37:
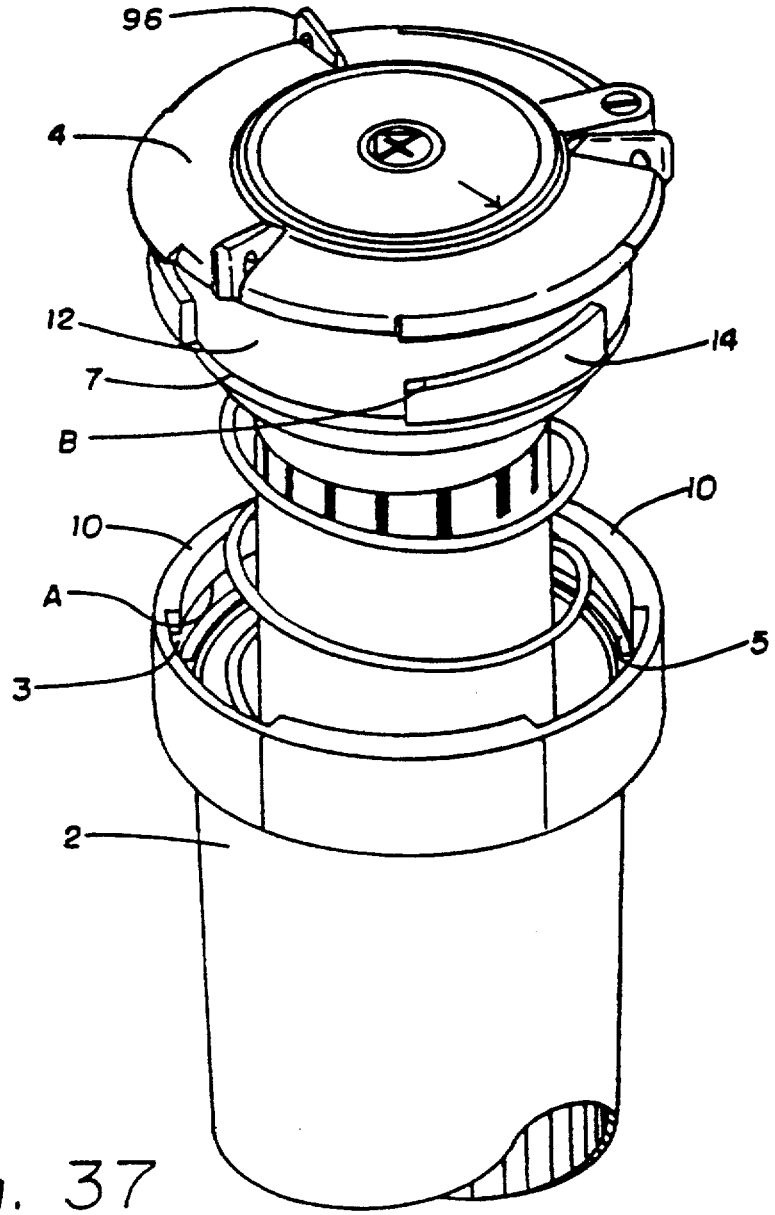
FIG. 37 is a side view of the sprinkler shown in its operating position.

In the setting of the oscillating angle by turning the setting shaft 116, if the motion of cylindrical member 68' is restricted and the setting shaft 116 turned with excessive force, the vane members 9' will bend out of grooves 5', preventing any breakage by forcing setting shaft 116 (see FIG. 33). The material and thickness of the vanes 9' can be controlled to achieve a desired torque at which vanes 9' will be bent out of grooves 5' which will limit the torque placed on all other related operating parts.

The output cap 108' can have its oscillating motion connected to a device requiring an oscillating input by a gear meshing with gear teeth 120'. Other drive means can be used, such as pullies.

If it is desired to use the transmission device 1' as an oscillating sprinkler head, a liquid such as water, can drive a turbine connected to input shaft 12' and then be directed into opening 95'. From opening 95' the liquid will pass through the smaller cylindrical section 68A' where it enters the larger part of cylindrical member 68' between the four spaced vane members 9'. The liquid then flows past individual projections 11' around shaft 116 in the lower cooperating cylindrical portion 51B' of cylindrical shaft member 51' into the upper hollow output shaft portion 51A' and into the output cap 108'. The liquid is directed outwardly from the output cap 108' through the oscillating nozzle opening 122.

It is to be understood that changes and modifications may be made to the disclosed invention without departing from the spirit and scope of the invention as defined in the claims.

I claim:

1. A sprinkler having a cylindrical housing, a cover member thereon having an opening, a riser means mounted for axial movement in said cylindrical housing between an extended and retracted position, said riser means extending through said opening in said cover member, a resilient cylindrical sealing means fixed relative to said cover member having a long cylindrical member around said riser means, the inside of said long cylindrical member contacting said riser means-for sealing, means for directing water to said cylindrical housing, the outside of said long cylindrical member being open to the inside of said cylindrical housing to sense water pressure thereon when water is directed to said cylindrical housing to move said riser means to its extended position, a flange means extends from said riser means, a coiled spring means is located around said long cylindrical member between said cover member and flange means on said riser means to bias said riser means to its retracted position, said coiled spring means being compressed when said riser means is in its extended position, said long cylindrical member extending downwardly to just below the bottom of the fully compressed coiled spring means to seal with said flange means.

2. A sprinkler as set forth in claim 1 wherein said flange means has an annular groove to receive the bottom of said long cylindrical member.

3. A sprinkler as set forth in claim 1 wherein said flange means comprises a flange fixed on said riser means with a separate annular ring mounted thereon, said annular ring having a plurality of projections located around its lower surface and said upper surface of said flange having an equal number of mating indentations, the outer edge of said annular flange having a radial projection, the side wall of said cylindrical housing having a longitudinal groove therein, said projection extending into said longitudinal groove to fix said annular flange in place, said projections mating with said indentations maintaining a set relative position between said riser means and cylindrical housing, said riser means can be reset at a different angular position with said cylindrical housing by forcing the projections in one direction or the other over the indentations.

4. A sprinkler as set forth in claim 3 having a nozzle housing mounted for rotation at a setable arc on said riser means, said nozzle housing having nozzle means, means on the top of said nozzle housing to set the arc movement of said nozzle means, means for direct reading of the arc movement set on said nozzle housing, means for manually rotating said riser member in said housing to position it as desired.

5. A sprinkler as set forth in claim 4 wherein said cylindrical housing has a locking lug for receiving a lock wire, a ground supply pipe for directing water to said cylindrical housing, a lock wire connected between said locking lug and said ground supply pipe for preventing rotation of said housing.

6. A sprinkler as set forth in claim 1 wherein said flange means comprises a flange fixed on said riser means, a spring retainer ring mounted on said flange, means fixing said spring retainer ring against rotation in said cylindrical housing, holding means to maintain said spring retainer ring and said flange at a set relative position during operation, said holding means having means to permit relative rotation of said flange and spring retainer ring by applying a rotative force on the riser member to overcome said holding means.

7. A sprinkler as set forth in claim 6 wherein said spring retainer ring has an annular groove to receive the bottom of said long cylindrical member.

8. A sprinkler as set forth in claim 7 wherein said holding means comprises engaged projections and mating recesses between said spring retainer ring and said flange whereby said spring retainer ring and said flange can be moved relative to each other by forcing said projections out or said engaged recesses to other recesses.

9. A sprinkler, said sprinkler having a housing, a riser member in said housing, a cover on the top of said housing, said riser member extending through an opening in said cover for movement between an extended "operating" position and a retracted "off" position, seal means between said cover and said riser member, spring means for placing said riser member in its retracted "off" position, means for admitting water to said housing below said riser member for placing said riser member in its extended "operating" position, a nozzle housing mounted for oscillation at a setable arc on said riser member, said nozzle housing having nozzle means, means to set the arc of oscillating movement of said nozzle means at a desired angle, means on the top of said nozzle housing for direct reading of the arc of oscillating movement set on said nozzle housing in said retracted "off" position or said extended "operating" position.

10. A sprinkler, said sprinkler having a housing, a riser member in said housing, a cover on the top of said housing, said riser member extending through an opening in said cover for movement between an extended "operating" position and a retracted "off" position, seal means between said cover and said riser member, spring means for placing said riser member in its retracted "off" position, means for admitting water to said housing below said riser member for placing said riser member in its extended "operating" position, a nozzle housing mounted for oscillation at a setable arc on said riser member, said nozzle housing having nozzle means, means on the top of said nozzle housing to set the arc of oscillating movement of said nozzle means, means for direct reading of the arc of oscillating movement set on said nozzle housing, flange means on said riser member, said spring means being positioned between said seal means and said flange means, said flange means comprises a flange fixed on said riser member, a spring retainer ring mounted on said flange, means fixing said spring retainer ring against rotation in said housing, holding means to maintain said spring retainer ring and said flange at a set relative position during operation and permit relative rotation between said flange and spring retainer ring by applying a rotative force on the riser member to overcome said holding means.

11. A sprinkler, said sprinkler having a housing, a riser member in said housing, a cover on the top of said housing, said riser member extending through an opening in said cover for movement between an extended "operating" position and a retracted "off" position, seal means between said cover and said riser member, spring means for placing said riser member in its retracted "off" position, means for admitting water to said housing below said riser member for placing said riser member in its extended "operating" position, a nozzle housing mounted for oscillation at a setable arc on said riser member, said nozzle housing having nozzle means, means on the top of said nozzle housing to set the arc of oscillating movement of said nozzle means, means for direct reading of the arc of oscillating movement set on said nozzle housing, said cover and housing have a quick connect-disconnect fixing means between them, said cover having a downwardly extending annular flange, said housing having an enlarged top portion to receive said annular flange therein, said top portion and annular flange having a plurality of interlocking radial lugs with axially facing locking surfaces.

12. A sprinkler, said sprinkler having a housing, a riser member in said housing, a cover on the top of said housing, said riser member extending through an opening in said cover for movement between an extended "operating" position and a retracted "off" position, seal means between said cover and said riser member, spring means for placing said riser member in its retracted "off" position, means for admitting water to said housing below said riser member for placing said riser member in its extended "operating" position, a nozzle housing mounted for oscillation at a setable arc on said riser member, said nozzle housing having nozzle means, means on the top of said nozzle housing to set the arc of oscillating movement of said nozzle means, means for direct reading of the arc of oscillating movement set on said nozzle housing, means for manually rotating said riser member to properly direct the arc of oscillating movement of said nozzle means.

13. A combination as set forth in claim 12 wherein said riser member is manually rotatable in said housing to properly direct the arc of oscillating movement of said nozzle means, and means for preventing rotation of said housing.

14. A sprinkler as set forth in claim 12 including means for preventing rotation of said housing.

15. A sprinkler, said sprinkler having a housing, said sprinkler housing has a locking lug for receiving a lock wire, a riser member in said housing, a cover on the top of said housing, said riser member extending through an opening in said cover for movement between an extended "operating" position and a retracted "off" position, seal means between said cover and said riser member, spring means for placing said riser member in its retracted "off" position, means for admitting water to said housing below said riser member for placing said riser member in its extended "operating" position, said means for admitting water including a ground supply pipe, a nozzle housing mounted for oscillation at a setable are on said riser member, a lock wire connected between said locking lug and said ground supply pipe for preventing rotation of said housing, said nozzle housing having nozzle means, means on the top of said nozzle housing to set the arc of oscillating movement of said nozzle means, means for direct reading of the arc of oscillating movement set on said nozzle housing, means for manually rotating said riser member to properly direct the arc of oscillating movement of said nozzle means.

16. A sprinkler, said sprinkler having a housing, a riser member in said housing, a cover on the top of said housing, said riser member extending through an opening in said cover for movement between an extended "operating" position and a retracted "off" position, seal means between said cover and said riser member, spring means for placing said riser member in its retracted "off" position, means for admitting water to said housing below said riser member for placing said riser member in its extended "operating" position, a nozzle housing mounted on said riser member for oscillation, said nozzle housing having nozzle means, said nozzle means having a fixed flow area nozzle, said nozzle means having a setable oscillating arc of coverage, means on the top of said nozzle housing to set the oscillating arc of coverage at a desired angle in said retracted "off" position or in said extended "operating" position, means for direct reading of the oscillating arc set on said nozzle housing.

17. A sprinkler, said sprinkler having a housing, a riser member in said housing, a cover on the top of said housing, said riser member extending through an opening in said cover for movement between an extended "operating" position and a retracted "off" position, seal means between said cover and said riser member, spring means for placing said riser member in its retracted "off" position, means for admitting water to said housing below said riser member for placing said riser member in its extended "operating" position, a nozzle housing mounted on said user member, said nozzle housing having nozzle means, said nozzle means having a setable arc of coverage, means on the top of said nozzle housing to set the are of coverage, means for direct reading of the are set on said nozzle housing, means for manually rotating said riser member to properly direct the arc of said nozzle means.

18. A combination as set forth in claim 17 wherein said user member is manually rotatable in said housing to properly direct the arc of said nozzle means.

19. A sprinkler, said sprinkler having a housing, a user member in said housing, a cover on the top of said housing, said riser member extending through an opening in said cover for movement between an extended "operating" position and a retracted "off" position, seal means between said cover and said riser member, spring means for placing said riser member in its retracted "off" position, means for admitting water to said housing below said riser member for placing said riser member in its extended "operating" position, a nozzle housing having nozzle means, said nozzle housing being mounted for rotation, a drive means for rotating said nozzle housing, said drive means having reversing means for reversing rotation of said nozzle housing from one direction to the other for oscillation, means rotatable with said nozzle housing for contacting said reversing means to reverse rotation of said nozzle housing to determine the arc of oscillating movement, said means rotatable with said nozzle housing being adjustable to vary the arc of oscillating movement, means on the top of said nozzle housing to set the are of oscillating movement of said nozzle means at a desired angle in said retracted "off" position or in said extended "operating" position, means on the top surface of the nozzle housing for direct reading of the arc of oscillating movement set on said nozzle housing.

20. A sprinkler, said sprinkler having a housing, a riser member in said housing, a cover on the top of said housing, said riser member extending through an opening in said cover for movement between an extended "operating" position and a retracted "off" position, seal means between said cover and said riser member, spring means for placing said riser member in its retracted "off" position, means for admitting water to said housing below said riser member for placing said riser member in its extended "operating" position, a nozzle housing having nozzle means, said nozzle housing being mounted for rotation, a drive means for rotating said nozzle housing, said drive means having reversing means for reversing rotation of said nozzle housing from one direction to the other, means rotatable with said nozzle housing for contacting said reversing means to reverse rotation of said nozzle housing to determine the arc of rotation, said means rotatable with said nozzle housing being adjustable to vary the arc movement, means on the top of said nozzle housing to set the arc movement of said nozzle means, means on the top surface of the nozzle housing for direct reading of the arc movement set on said nozzle housing, means for manually rotating said riser member to properly direct the arc movement of said nozzle means.

21. A sprinkler, said sprinkler having a housing, a riser member in said housing, a cover on the top of said housing, said riser member extending through an opening in said cover for movement between an extended "operating" position and a retracted "off" position, seal means between said cover and said riser member, spring means for placing said riser member in its retracted "off" position, means for admitting water to said housing below said riser member for placing said riser member in its extended "operating" position, a nozzle housing having nozzle means, said nozzle housing being mounted for rotation, a drive means for rotating said nozzle housing, said drive means having reversing means for reversing rotation of said nozzle housing from one direction to the other for oscillation, said reversing means having contact means to reverse rotation of said nozzle housing at a predetermined are of oscillating movement, said contact means being adjustable to vary the arc of oscillating movement, means on the top of said nozzle housing to set the arc of oscillating movement of said nozzle means at a desired angle in said retracted "off" position or in said extended "operating" position, means on the top surface of the nozzle housing for direct reading of the arc of oscillating movement set on said nozzle housing.

22. A combination as set forth in claim 21 wherein said means on the top of said nozzle housing to set the are movement of said nozzle means adjusts said contact means.

23. A sprinkler, said sprinkler having a rotatable nozzle housing, said sprinkler having water inlet means, two nozzles in said nozzle housing, water driven means in said sprinkler for rotating said nozzle housing, first passage means in said sprinkler for directing a flow of water from said water inlet means through said water driven means to one of said nozzles, second passage means in said sprinkler for directing a flow of water from said water inlet means directly to said other nozzle.

24. A sprinkler as set forth in claim 23 wherein said second passage means includes valving means for controlling the flow of water to said other nozzle.

25. A sprinkler as set forth in claim 23 wherein said second passage means has a first non-rotating annular opening, a second rotating annular opening aligned with said first non-rotating annular opening to control flow to said other nozzle, an annular secondary flow inlet insert located in said first annular opening, a secondary flow control plate controlling flow through said second annular opening.

26. A sprinkler as set forth in claim 25 wherein said secondary flow control plate has a contoured opening for directing a predetermined flow to said other nozzle to produce a desired precipitation pattern, and said annular secondary flow inlet insert has an opening for directing flow from said second passage means to said contoured opening.

27. A sprinkler as set forth in claim 26 wherein said annular secondary flow inlet insert has a second opening, said secondary flow control plate has a third opening to admit additional flow from said second opening to said other nozzle to supplement flow from said contoured opening.

28. A sprinkler as set forth in claim 23 wherein said rotatable nozzle housing includes a chamber at the center thereof forming a portion of the first passage means connected to said one of said nozzles, said rotatable nozzle housing also including an annular chamber around said center chamber forming a portion of the second passage means connected to said other nozzle.

29. A sprinkler as set forth in claim 28 wherein valve means is provided to control the flow of water entering said annular chamber.

30. A sprinkler as set forth in claim 28 including means for oscillating said nozzle housing, means on the exterior of said nozzle housing for setting said nozzles at a desired are of coverage and indicating said desired arc of coverage.

31. A combination as set forth in claim 30 including means on the top of said nozzle housing for direct reading of the arc set on said nozzle housing.

32. A combination as set forth in claim 30 wherein said means for indicating the desired arc of coverage also indicates the proper direction of the arc of coverage.

33. A rotary drive sprinkler comprising a riser member for receiving a supply of water, a nozzle assembly means for directing water therefrom, said nozzle assembly means having a nozzle, said riser member having an output shaft means, said output shaft means connected to said nozzle assembly means, a rotary drive assembly in said riser member, said rotary drive assembly having an output means for driving said output shalt means, said rotary drive assembly having a reversing mechanism including means for reversing the direction of rotation of said output means to obtain oscillation of said output shaft means, two angular limit contact means rotatable with said nozzle assembly means, said reversing mechanism having actuation means for engagement by said two angular limit contact means for changing the direction of rotation of said nozzle assembly, setting means on said nozzle assembly means for setting the relative position of said contact means to obtain a desired angle of oscillation, wherein said setting means includes indicating means on the top of said nozzle assembly means for reading out the angle of oscillation, means for rotating said riser member to properly align said angle of oscillation in a desired direction.

34. A rotary drive sprinkler comprising a riser member for receiving a supply of water, a nozzle assembly means for directing water therefrom, said nozzle assembly means having a nozzle, said riser member having an output shaft means, said output shaft means connected to said nozzle assembly means, a rotary drive assembly in said riser member, said rotary drive assembly having an output means for driving said output shaft means, said rotary, drive assembly having a reversing mechanism including means for reversing the direction of rotation of said output means to obtain oscillation of said output shaft means, setable limit contact means for setting an angle of oscillation, said reversing mechanism having actuation means for engagement by said setable limit contact means for changing the direction of rotation of said nozzle assembly, indicating means on the exterior of the top of said nozzle assembly means for reading out the angle of oscillation, means for manually rotationally positioning said indicated angle of oscillation in a proper direction to obtain desired ground coverage.

35. A sprinkler, said sprinkler having a riser member, a nozzle housing mounted for oscillation at a setable arc on said riser member, said nozzle housing having nozzle means, reversing drive means in said riser member, setting means on the top of said nozzle housing for setting the desired angle of oscillation of said reversing drive means to oscillate said nozzle means at a desired angle of oscillation to obtain desired ground coverage in a specific direction, slip means between said setting means and said nozzle housing, second slip means connecting said drive means to said nozzle housing for driving it, said first and second slip means providing for improper rotation of said nozzle housing without damaging said reversing drive means or selling means.

36. A combination as set forth in claim 35 wherein said first and second slip means provides for maintaining said angle of oscillation at its desired angle after improper rotation, said desired angle while remaining the same is not directed to said specific direction.

37. A combination as set forth in claim 36 wherein a third slip means is located between said riser member and a base housing for permitting rotation of said riser member in said housing to allow repositioning of the nozzle housing to obtain ground coverage in a specific direction.

38. A rotary drive sprinkler comprising a sprinkler housing for receiving a supply of water, a riser member in said housing, a cover on the top or said housing, said riser member extending through an opening in said cover for movement between an extended "operating" position and a retracted "OFF" position, a nozzle housing mounted on said riser member, said nozzle housing having a nozzle for directing water therefrom, said nozzle housing having a top, said riser member having an output shaft means, said output shaft means connected to said nozzle housing, a rotary drive means in said riser member for driving said output shaft means, said rotary drive means having a reversing mechanism including means for reversing the direction of rotation of said output shaft means to obtain oscillation of said output shaft means, two angular limit contact means for setting a desired angle of oscillation of said nozzle housing, means mounting said two angular limit contact means for relative rotational movement to change the desired angle of oscillation of said nozzle housing, setting means on said nozzle housing for changing the relative position of said angular limit contact means to each other in said retracted "OFF" position or in said extended "operating" position to obtain a desired angle or oscillation, indicating means on the exterior of said nozzle housing for reading out the angle of oscillation.

39. A combination as set forth in claim 38 wherein said indicating means also indicates the direction of the angle of oscillation.

40. A combination as set forth in claim 38 wherein said indicating means is on the top of said nozzle housing.

41. A combination as set forth in claim 38 wherein said setting means on said nozzle housing has a rod connected to said angular limit contact means.

42. A combination as set forth in claim 38 wherein said indicating means has two relatively movable indicators, one indicator being aligned with the nozzle, the other indicator indicates the angle or oscillation, said other indicator being located in the center or the exterior or the top of said nozzle housing.

43. A combination as set forth in claim 38 wherein said sprinkler housing has a locking lug for receiving a lock wire, a ground supply pipe admitting water to said sprinkler housing for directing water to said riser member, a lock wire connected between said locking lug and said ground supply pipe for preventing rotation of said housing.

44. A rotary drive sprinkler comprising a sprinkler housing for receiving a supply of water, a riser member in said housing, a cover on the top of said housing, said riser member extending through an opening in said cover for movement between an extended "operating" position and a retracted "OFF" position, a nozzle housing mounted on said riser member, said nozzle housing having a nozzle for directing water therefrom, said nozzle housing having a top, said riser member having an output shaft means, said output shaft means connected to said nozzle housing, a rotary drive means in said riser member for driving said output shaft means, said rotary drive means having a reversing mechanism including means for reversing the direction of rotation of said output shaft means to obtain oscillation of said output shaft means, two angular limit contact means for setting a desired angle of oscillation of said nozzle housing, means mounting said two angular limit contact means for relative rotational movement to change the desired angle of oscillation of said nozzle housing, setting means on said nozzle housing for changing the relative position of said angular limit contact means to each other to obtain a desired angle of oscillation, indicating means on the exterior of said nozzle housing for reading out the angle of oscillation, said indicating means also indicates the direction of the angle of oscillation, said riser member has means allowing the riser member to be manually rotated within said sprinkler housing without rotating the housing to align said indicated angle of oscillation to the area to be covered on the ground.

45. A sprinkler, said sprinkler having a housing, a riser member in said housing, a cover on the top of said housing, said riser member extending through an opening in said cover for movement between an extended "operating" position and a retracted "OFF" position, seal means between said cover and said riser member, spring means for placing said riser member in its retracted "OFF" position, means for admitting water to said housing below said riser member for placing said riser member in is extended "operating" position, a nozzle housing mounted for oscillation at a setable arc on said riser member, said nozzle housing having nozzle means, means on the top of said nozzle housing to set the arc of oscillating movement of said nozzle means, means for manually rotating said riser member to properly direct the arc of oscillating movement of said nozzle means.

46. A combination as set forth in claim 45 wherein said riser member is manually rotatable in said sprinkler housing to properly direct the arc of oscillating movement of said nozzle means, and means for preventing rotation of said sprinkler housing.

*47. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "opening" position, a nozzle housing mounted for oscillation at a setable arc on said riser member, said nozzle housing having nozzle means, drive means in said riser member for rotating said nozzle housing through a set arc of motion, reversing means for reversing the direction of rotation of said nozzle housing, means to set the arc of oscillating movement of said nozzle means at a desired angle, means on the top of said nozzle housing for direct reading of the arc of oscillating movement set on said nozzle housing in said retracted "off" position or said extended "operating" position.*

*48. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing mounted for oscillation at a setable arc on said riser member, said nozzle housing having nozzle means, drive means in said riser member for rotating said nozzle housing through a set arc of motion, reversing means for reversing the direction of rotation of said nozzle housing, means on the top of said nozzle housing to set the arc of oscillating movement of said nozzle means, means for direct reading of the arc of oscillating movement set on said nozzle housing, flange means on said riser member, said spring means being positioned to act on said flange means, said flange means comprising a flange fixed on said risr member, a spring retainer ring mounted on said flange, means fixing said spring retainer ring against rotation in said housing, holding means to maintain said spring retainer ring and said flange at a set relative position during operation and permit relative rotation between said flange and spring retainer ring by applying a rotative force on the riser member to overcome said holding means.*

*49. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing mounted for oscillation at a setable arc on said riser member, said nozzle housing having nozzle means, drive means in said riser member for rotating said nozzle housing through a set arc of motion, reversing means for reversing the direction of rotation of said nozzle housing, means on the top of said nozzle housing to set the arc of oscillating movement of said nozzle means, means for direct reading of the arc of oscillating movement set on said nozzle housing, said cover and housing have a quick connect-disconnect fixing means between them, said cover having a downwardly extending annular flange, said housing having an enlarged top portion to receive said annular flange therein, said top portion and annular flange having a plurality of interlocking radial lugs with axially facing locking surfaces.*

*50. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing mounted for oscillation at a setable arc on said riser member, said nozzle housing having nozzle means, drive means in said riser member for rotating said nozzle housing through a set arc of motion, reversing means for reversing the direction of rotation of said nozzle housing, means on the top of said nozzle housing to set the arc of oscillating movement of said nozzle means, means for direct reading of the arc of oscillating movement set on said nozzle housing, means for manually rotating said riser member to properly direct the arc of oscillating movement of said nozzle means.*

*51. A sprinkler, said sprinkler having a housing, said sprinkler housing has a locking lug for receiving a lock wire, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, said means for admitting water including a ground supply pipe, a nozzle housing mounted for oscillation at a setable arc on said riser member, a lock wire connected between said locking lug and said ground supply pipe for preventing rotation of said housing, said nozzle housing having nozzle means, drive means in said riser member for rotating said nozzle housing through a set arc of motion, reversing means for reversing the direction of rotation of said nozzle housing, means on the top of said nozzle housing to set the arc of oscillating movement of said nozzle means, means for direct reading of the arc of oscillating movement set on said nozzle housing, means for manually rotating said riser member to properly direct the arc of oscillating movement of said nozzle means.*

*52. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing mounted on said riser member for oscillation, said nozzle housing having nozzle means, said nozzle means having a fixed flow area nozzle, said nozzle means having a setable oscillating arc of coverage, drive means in said riser member for rotating said nozzle housing through a set arc of motion, reversing means for reversing the direction of rotation of said nozzle housing, means on the top of said nozzle housing to set the oscillating arc of coverage at a desired angle in said retracted "off" position or in said extended "operating" position, means for direct reading of the oscillating arc set on said nozzle housing.*

*53. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing mounted on said riser member, said nozzle housing having nozzle means, said nozzle means having a setable arc of coverage, drive means in said riser member for rotating said nozzle housing through a set arc of motion, reversing means for reversing the direction of rotation of said nozzle housing, means on the top of said nozzle housing to set the arc of coverage, means for direct reading of the arc set on said nozzle housing, means for manually rotating said riser member to properly direct the arc of said nozzle means.*

*54. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing having nozzle means, said nozzle housing being mounted for rotation, a drive means in said riser member for rotating said nozzle housing, said drive means having reversing means for reversing rotation of said nozzle housing from one direction to the other for oscillation, means rotatable with said nozzle housing for contacting said reversing means to reverse rotation of said nozzle housing to determine the arc of oscillating movement, said means rotatable with said nozzle housing being adjustable to vary the arc of oscillating movement, means on the top of said nozzle housing to set the arc of oscillating movement of said nozzle means at a desired angle in said retracted "off" position or in said extended "operating" position, means on the top surface of the nozzle housing for direct reading of the arc of oscillating movement set on said nozzle housing.*

*55. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing having nozzle means, said nozzle housing being mounted for rotation, a drive means in said riser member for rotating said nozzle housing, said drive means having reversing means for reversing rotation of said nozzle housing from one direction to the other, means rotatable with said nozzle housing for contacting said reversing means to reverse rotation of said nozzle housing to determine the arc of rotation, said means rotatable with said nozzle housing being adjustable to vary the arc movement, means on the top of said nozzle housing to set the arc movement of said nozzle means, means on the top surface of the nozzle housing for direct reading of the arc movement set on said nozzle housing, means for manually rotating said riser member to properly direct the arc movement of said nozzle means.*

*56. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended*

*"operating" position, a nozzle housing having nozzle means, said nozzle housing being mounted for rotation, a drive means in said riser member for rotating said nozzle housing, said drive means having reversing means for reversing rotation of said nozzle housing from one direction to the other for oscillation, said reversing means having contact means to reverse rotation of said nozzle housing at a predetermined arc of oscillating movement, said contact means being adjustable to vary the arc of oscillating movement, means on the top of said nozzle housing to set the arc of oscillating movement of said nozzle means at a desired angle in said retracted "off" position or in said extended "operating" position, means on the top surface of the nozzle housing for direct reading of the arc of oscillating movement set on said nozzle housing.*

*57. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing mounted for oscillation at a setable arc on said riser member, said nozzle housing having nozzle means, means to set the arc of oscillating movement of said nozzle means at a desired angle, means on the top of said nozzle housing for direct reading of the arc of oscillating movement set on said nozzle housing in said retracted "off" position or said extended "operating" position.*

*58. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing mounted for oscillation at a setable arc on said riser member, said nozzle housing having nozzle means, means on the top of said nozzle housing to set the arc of oscillating movement of said nozzle means, means for direct reading of the arc of oscillating movement set on said nozzle housing, flange means on said riser member, said spring means being positioned to act on said flange means, said flange means comprising a flange fixed on said riser member, a spring retainer ring mounted on said flange, means fixing said spring retainer ring against rotation in said housing, holding means to maintain said spring retainer ring and said flange at a set relative position during operation and permit relative rotation between said flange and spring retainer ring by applying a rotative force on the riser member to overcome said holding means.*

*59. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing mounted for oscillation at a setable arc on said riser member, said nozzle housing having nozzle means, means on the top of said nozzle housing to set the arc of oscillating movement of said nozzle means, means for direct reading of the arc of oscillating movement set on said nozzle housing, said cover and housing have a quick connect-disconnect fixing means between them, said cover having a downwardly extending annular flange, said housing having an enlarged top portion to receive said annular flange therein, said top portion and annular flange having a plurality of interlocking radial lugs with axially facing locking surfaces.*

*60. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing mounted for oscillation at a setable arc on said riser member, said nozzle housing having nozzle means, means on the top of said nozzle housing to set the arc of oscillating movement of said nozzle means, means for direct reading of the arc of oscillating movement set on said nozzle housing, means for manually rotating said riser member to properly direct the arc of oscillating movement of said nozzle means.*

*61. A sprinkler, said sprinkler having a housing, said sprinkler housing has a locking lug for receiving a lock wire, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, said means for admitting water including a ground supply pipe, a nozzle housing mounted for oscillation at a setable arc on said riser member, a lock wire connected between said locking lug and said ground supply pipe for preventing rotation of said housing, said nozzle housing having nozzle means, means on the top of said nozzle housing to set the arc of oscillating movement of said nozzle means, means for direct reading of the arc of oscillating movement set on said nozzle housing, means for manually rotating said riser member to properly direct the arc of oscillating movement of said nozzle means.*

*62. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing mounted on said riser member for oscillation, said nozzle housing having nozzle means, said nozzle means having a fixed flow area nozzle, said nozzle means having a setable oscillating arc of coverage, means on the top of said nozzle housing to set the oscillating arc of coverage at a desired angle in said retracted "off" position or in said extended "operating" position, means for direct reading of the oscillating arc set on said nozzle housing.*

*63. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser*

*member for placing said riser member in its extended "operating" position, a nozzle housing mounted on said riser member, said nozzle housing having nozzle means, said nozzle means having a setable arc of coverage, means on the top of said nozzle housing to set the arc of coverage, means for direct reading of the arc set on said nozzle housing, means for manually rotating said riser member to properly direct the arc of said nozzle means.*

*64. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing having nozzle means, said nozzle housing being mounted for rotation, a drive means for rotating said nozzle housing, said drive means having reversing means for reversing rotation of said nozzle housing from one direction to the other for oscillation, means rotatable with said nozzle housing for contacting said reversing means to reverse rotation of said nozzle housing to determine the arc of oscillating movement, said means rotatable with said nozzle housing being adjustable to vary the arc of oscillating movement, means on the top of said nozzle housing to set the arc of oscillating movement of said nozzle means at a desired angle in said retracted "off" position or in said extended "operating" position, means on the top surface of the nozzle housing for direct reading of the arc of oscillating movement set on said nozzle housing.*

*65. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing having nozzle means, said nozzle housing being mounted for rotation, a drive means for rotating said nozzle housing, said drive means having reversing means for reversing rotation of said nozzle housing from one direction to the other, means rotatable with said nozzle housing for contacting said reversing means to reverse rotation of said nozzle housing to determine the arc of rotation, said means rotatable with said nozzle housing being adjustable to vary the arc movement, means on the top of said nozzle housing to set the arc movement of said nozzle means, means on the top surface of the nozzle housing for direct reading of the arc movement set on said nozzle housing, means for manually rotating said riser member to properly direct the arc movement of said nozzle means.*

*66. A sprinkler, said sprinkler having a housing, a riser member in said housing, a cover on the top of said housing, said riser member extending through an opening in said cover for movement between an extended "operating" position and a retracted "off" position, spring means for placing said riser member in its retracted "off" position, means for admitting water to said housing below said riser member for placing said riser member in its extended "operating" position, a nozzle housing having nozzle means, said nozzle housing being mounted for rotation, a drive means for rotating said nozzle housing, said drive means having reversing means for reversing rotation of said nozzle housing from one direction to the other for oscillation, said reversing means having contact means to reverse rotation of said nozzle housing at a predetermined arc of oscillating movement, said contact means being adjustable to vary the arc of oscillating movement, means on the top of said nozzle housing to set the arc of oscillating movement of said nozzle means at a desired angle in said retracted "off" position or in said extended "operating" position, means on the top surface of the nozzle housing for direct reading of the arc of oscillating movement set on said nozzle housing.*

* * * * *